US008653832B2

(12) United States Patent
Hadwen et al.

(10) Patent No.: US 8,653,832 B2
(45) Date of Patent: Feb. 18, 2014

(54) ARRAY ELEMENT CIRCUIT AND ACTIVE MATRIX DEVICE

(75) Inventors: Benjamin J. Hadwen, Oxford (GB); Jason R. Hector, Oxford (GB); Adrian Marc Simon Jacobs, Reading (GB); Patrick Zebedee, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 349 days.

(21) Appl. No.: 12/830,477

(22) Filed: Jul. 6, 2010

(65) Prior Publication Data

US 2012/0006684 A1 Jan. 12, 2012

(51) Int. Cl.
*B01D 57/02* (2006.01)

(52) U.S. Cl.
USPC ............................ 324/649; 204/600; 345/174

(58) Field of Classification Search
USPC .................... 324/649, 658–690, 519, 760.01, 324/760.02, 762.01, 762.08, 762.09; 204/600, 422
See application file for complete search history.

(56) References Cited

U.S. PATENT DOCUMENTS

| | | | | |
|---|---|---|---|---|
| 3,949,162 | A | 4/1976 | Malueg | |
| 5,194,862 | A * | 3/1993 | Edwards | 341/20 |
| 5,798,746 | A | 8/1998 | Koyama | |
| 6,565,727 | B1 | 5/2003 | Shenderov | |
| 6,911,132 | B2 | 6/2005 | Pamula et al. | |
| 7,163,612 | B2 | 1/2007 | Sterling et al. | |
| 7,255,780 | B2 | 8/2007 | Shenderov | |
| 7,329,545 | B2 | 2/2008 | Pamula et al. | |
| 2003/0006977 | A1 | 1/2003 | Hanari et al. | |
| 2003/0164295 | A1 | 9/2003 | Sterling | |
| 2006/0012575 | A1 | 1/2006 | Knapp et al. | |
| 2006/0017710 | A1 | 1/2006 | Lee et al. | |
| 2006/0114247 | A1 | 6/2006 | Brown | |
| 2007/0030255 | A1 * | 2/2007 | Pak et al. | 345/173 |
| 2007/0040814 | A1 * | 2/2007 | Lee et al. | 345/173 |
| 2007/0133334 | A1 | 6/2007 | Peng et al. | |
| 2007/0216657 | A1 * | 9/2007 | Konicek | 345/173 |
| 2009/0206850 | A1 * | 8/2009 | Chuang et al. | 324/686 |
| 2010/0039406 | A1 * | 2/2010 | Lee et al. | 345/174 |
| 2010/0163414 | A1 | 7/2010 | Gillies et al. | |
| 2010/0194699 | A1 * | 8/2010 | Chang | 345/173 |

FOREIGN PATENT DOCUMENTS

| | | | |
|---|---|---|---|
| EP | 0 464 908 | A2 | 1/1992 |
| GB | 2439118 | A * | 12/2007 |
| GB | 2475054 | A | 5/2011 |
| GB | 2475055 | A | 5/2011 |
| JP | 2005-510347 | A | 4/2005 |
| WO | 03/045556 | A2 | 6/2003 |

(Continued)

OTHER PUBLICATIONS

European Search Report for corresponding European Application No. 11172766.5 dated Sep. 30, 2011.

(Continued)

*Primary Examiner* — Melissa Koval
*Assistant Examiner* — Stephen G Armstrong
(74) *Attorney, Agent, or Firm* — Renner, Otto, Boisselle & Sklar, LLP

(57) ABSTRACT

An array element circuit with an integrated impedance sensor is provided. The array element circuit includes an array element which is controlled by application of a drive voltage by a drive element; writing circuitry for writing the drive voltage to the drive element; and sense circuitry for sensing an impedance presented at the drive element.

18 Claims, 18 Drawing Sheets

(56) References Cited

FOREIGN PATENT DOCUMENTS

| | | | |
|---|---|---|---|
| WO | 2008/055256 | A2 | 5/2008 |
| WO | 2008/101194 | A2 | 8/2008 |
| WO | 2009005680 | A1 | 1/2009 |
| WO | 2010/027894 | A2 | 3/2010 |

OTHER PUBLICATIONS

Ren et al., "Automated on-chip droplet dispensing with volume control by electro-wetting actuation and capacitance metering", Science Direct, Sensors and Actuators B 98 (2004) pp. 319-327.
Office Action for sibling U.S. Appl. No. 13/176,047, filed Jul. 5, 2011.
Patrick Tabeling, "Introduction to Microfluidics", Oxford University Press, ISBN 0-19-856864-9, Section 2.8, Feb. 2, 2006.
Takeda, "Hot Carrier Effects in MOS Devices", Academic Press Inc., ISBN 0-12-682240-9, pp. 40-42, 1995.
Robert A. Hayes, "Electrowetting-Based Information Displays", SID 08 Digest, pp. 651-654, May 2008.
Allen and Holberg, "CMOS Analog Circuit Design", ISBN—10: 016674707, section 5.3, 1987.
Brown et al., "A Continuous-Grain Silicon-System LCD With Optical Input Function", IEEE Journal of Solid State Circuits, vol. 42, Issue 12, Dec. 2007, pp. 2904-2912.
Lee et al., "Semiconductor Device for Modelling VLSI", Prentice-Hall, ISBN 0-13-805656-0, pp. 191-193, 1993.
Stewart et al., "High performance gated lateral polysilicon PIN diodes", Solid State Electronics, vol. 44, Issue 9, p. 1613-1619, Sep. 1, 2000.
Geiger et al., "VLSI Design Techniques for Analog and Digital Circuits", McGraw-Hill, ISBN 0-07-023253-9, Section 9.8, 1990.
Patrick Tabeling, "Introduction to Microfluidics", Oxford University Press, ISBN 0-19-856864-9, pp. 211-214, Feb. 2, 2006.
Thomas P. Hunt et al., "Integrated circuit/microfluidic chip to programmably trap and move cells and droplets with dielectrophoresis", Lab Chip, 2008, 8, 81-87.
Lueder, Addressing of LCDs with Poly-Si TFTs, Mar. 24, 2010.
Office Action corresponding to U.S. Appl. No. 13/347,856 dated May 6, 2013.

* cited by examiner

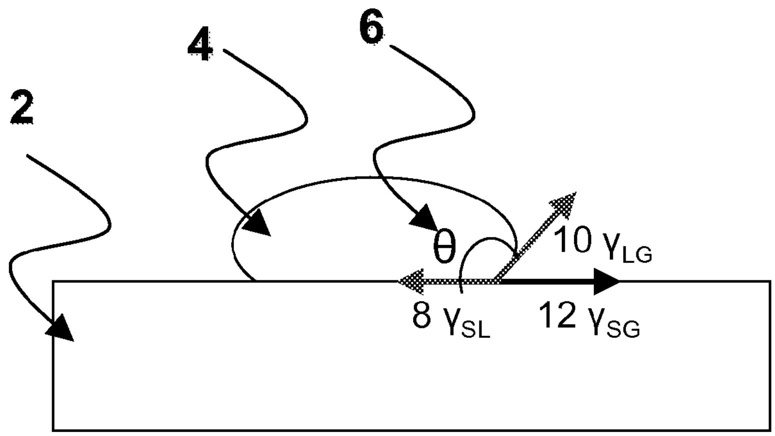
FIGURE 1: PRIOR ART
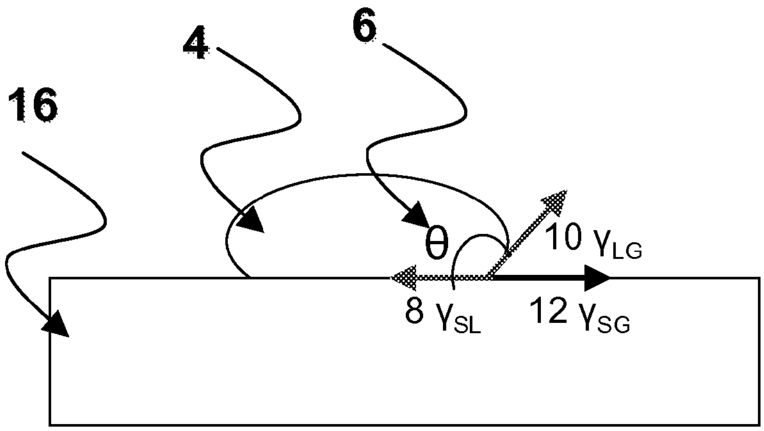
*Hydrophobic (θ >90º)*
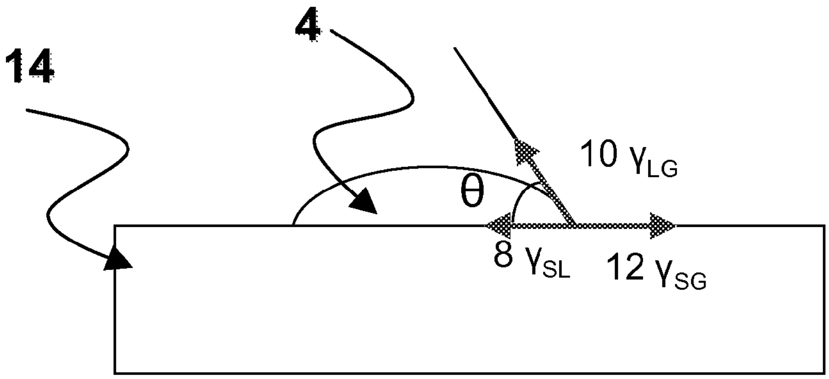
*Hydrophilic (θ <90º)*
FIGURE 2: PRIOR ART

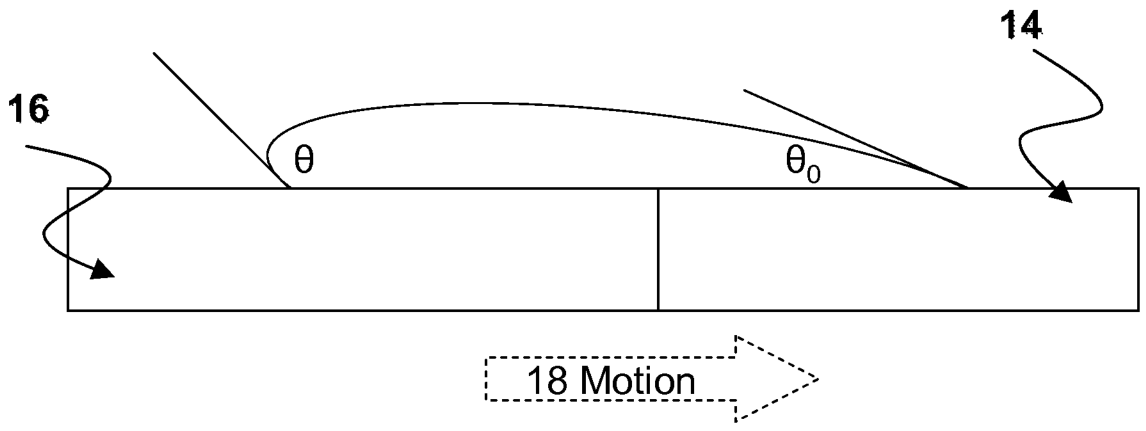
FIGURE 3: PRIOR ART
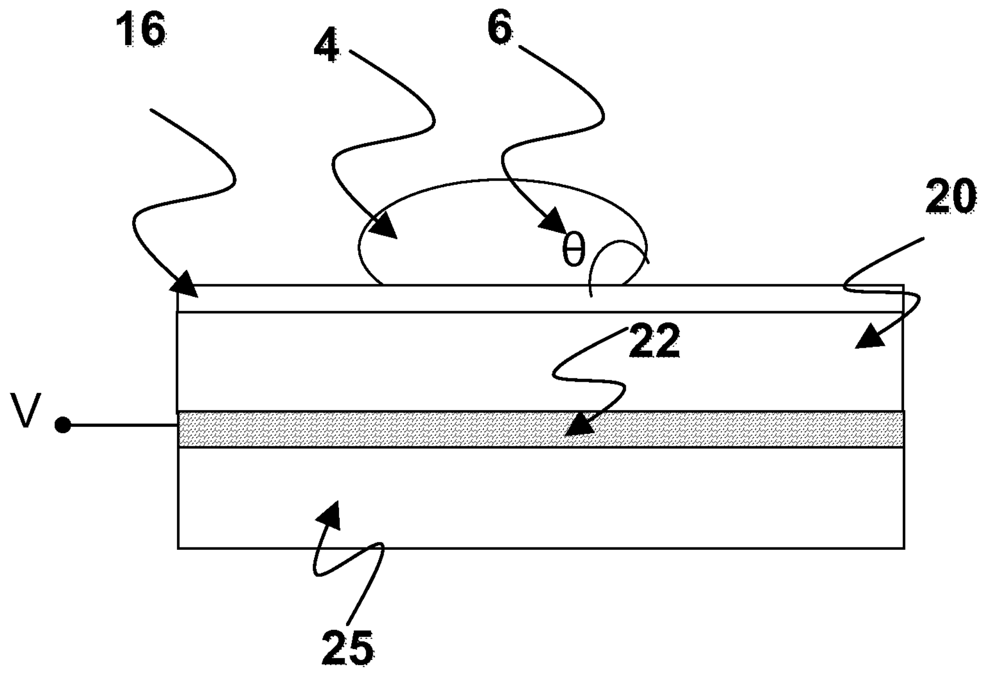
FIGURE 4: PRIOR ART

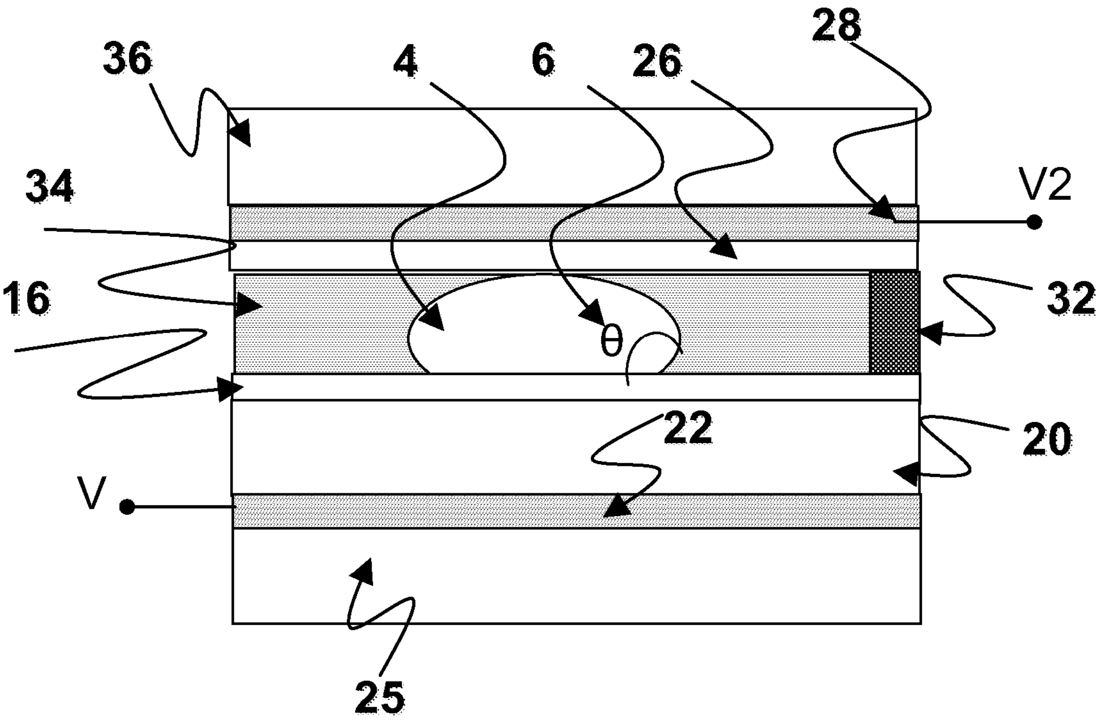
FIGURE 5: PRIOR ART
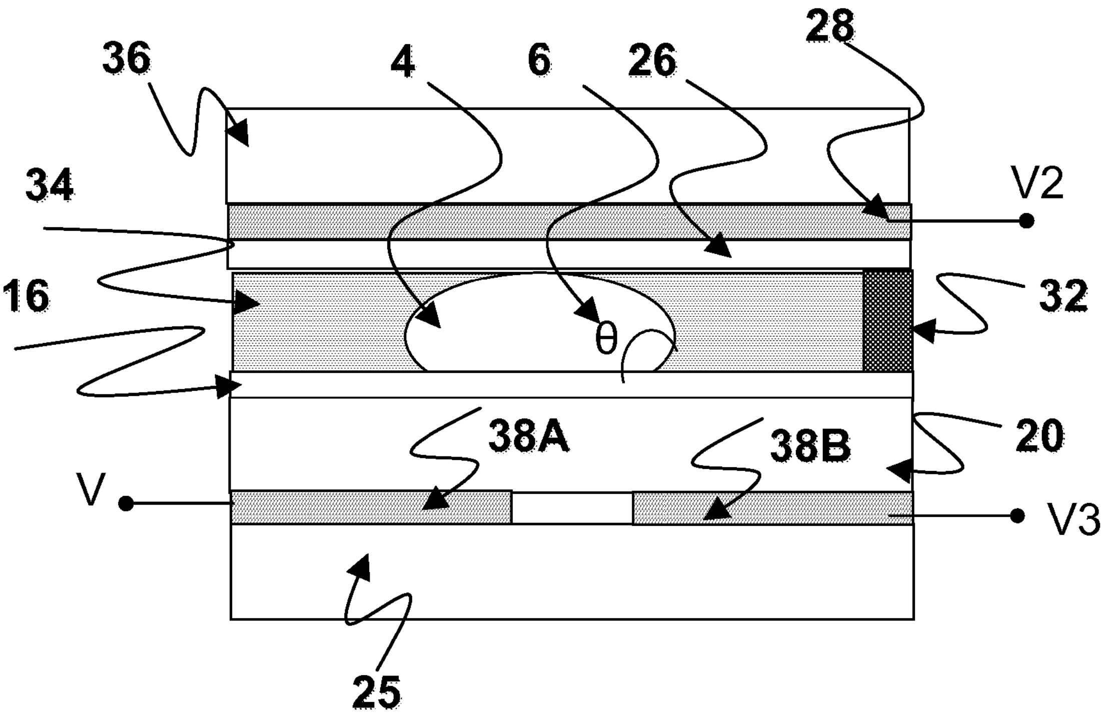
FIGURE 6: PRIOR ART

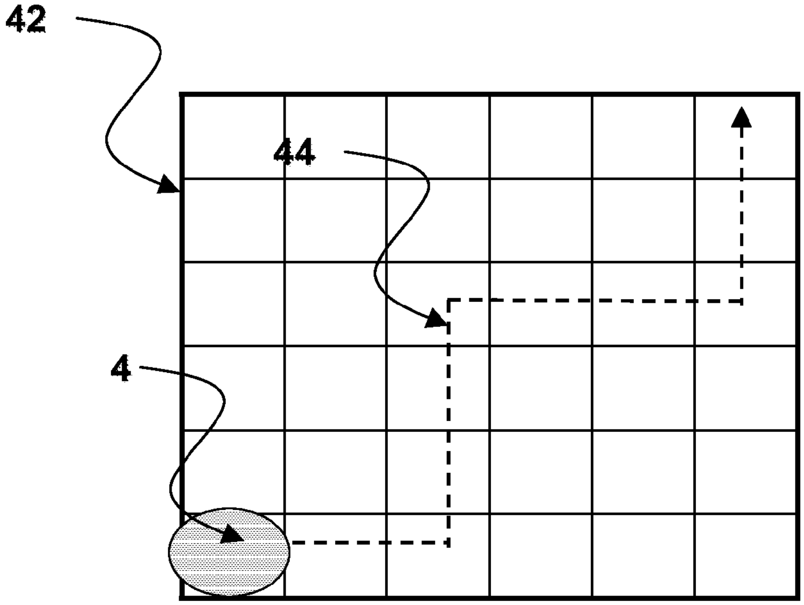
FIGURE 7: PRIOR ART
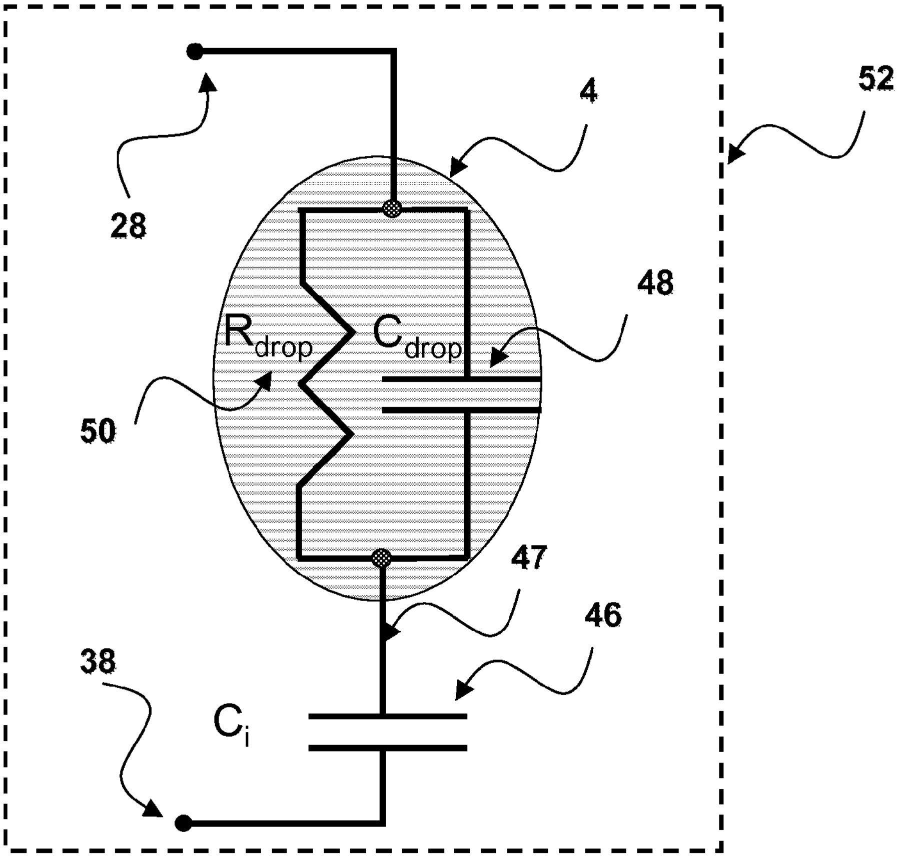
FIGURE 8: PRIOR ART

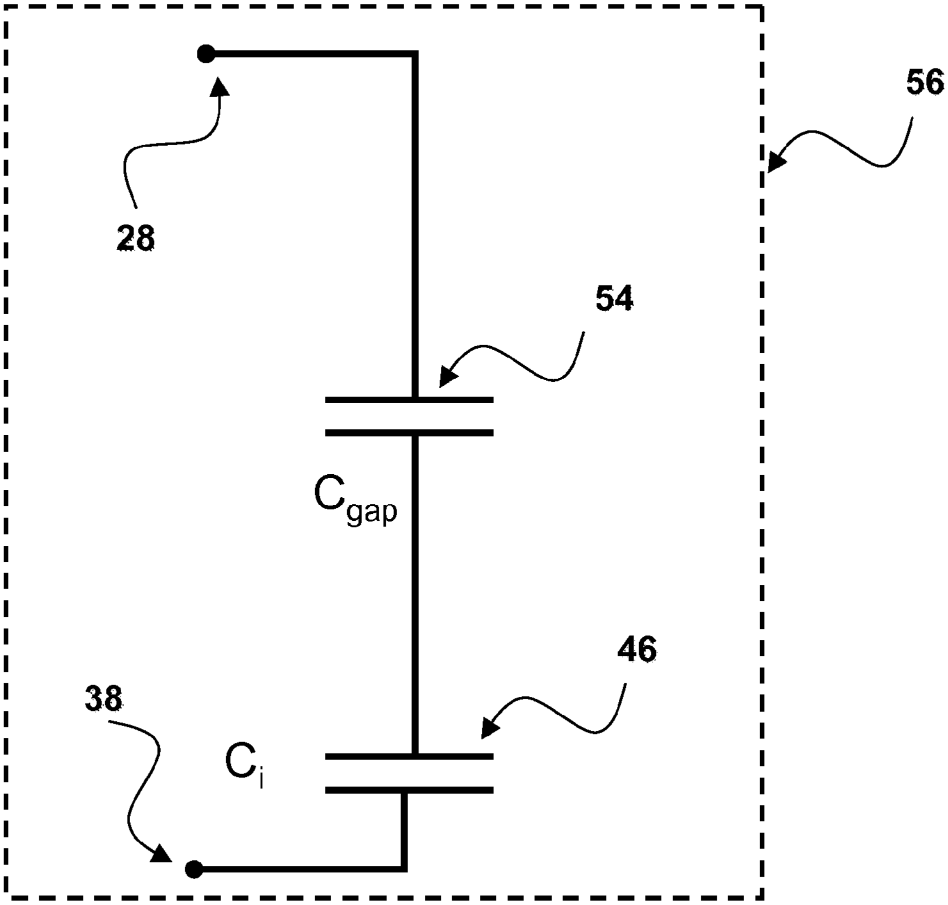
FIGURE 9: PRIOR ART
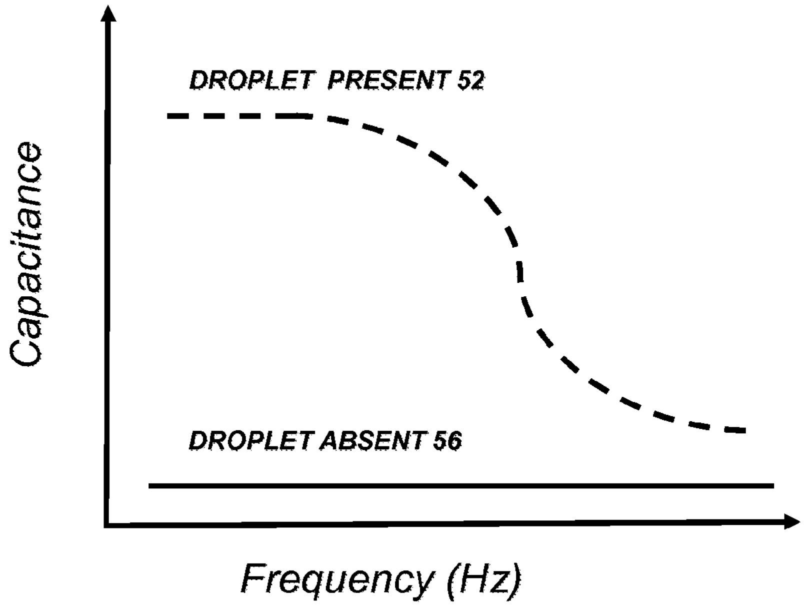
FIGURE 10: PRIOR ART

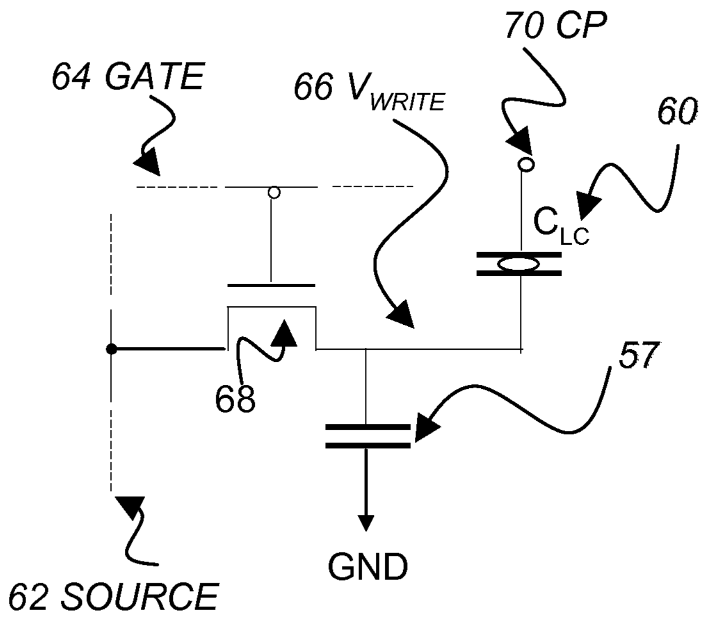
FIGURE 11: PRIOR ART
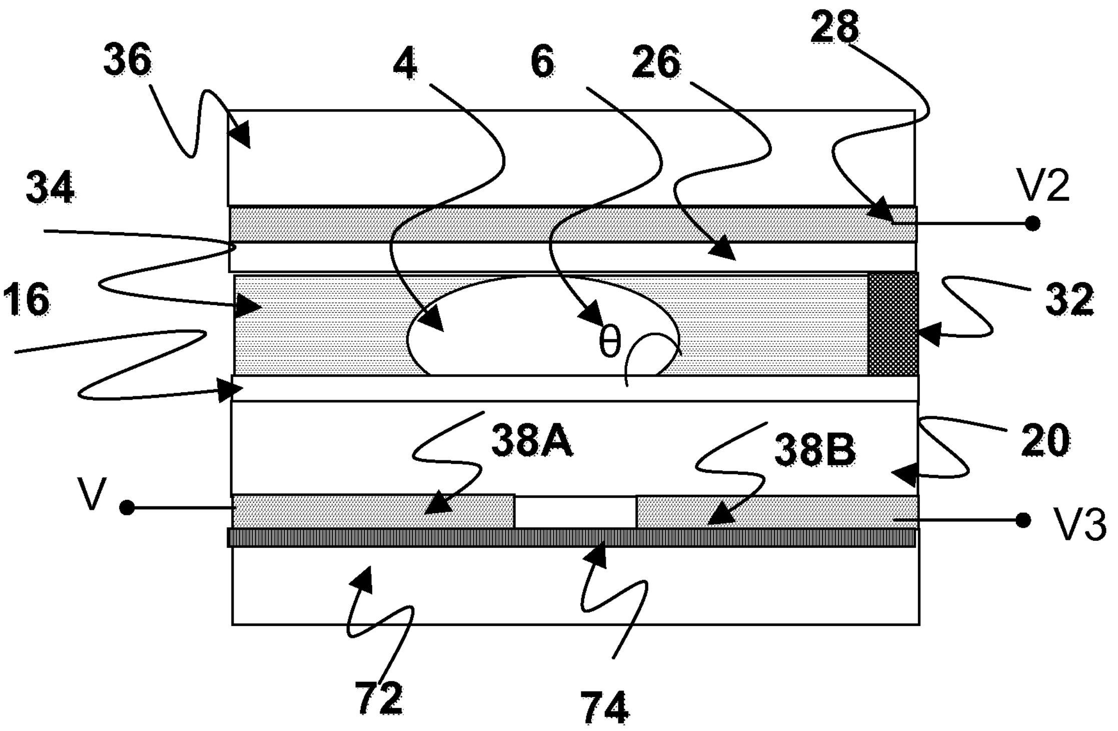
FIGURE 12: PRIOR ART

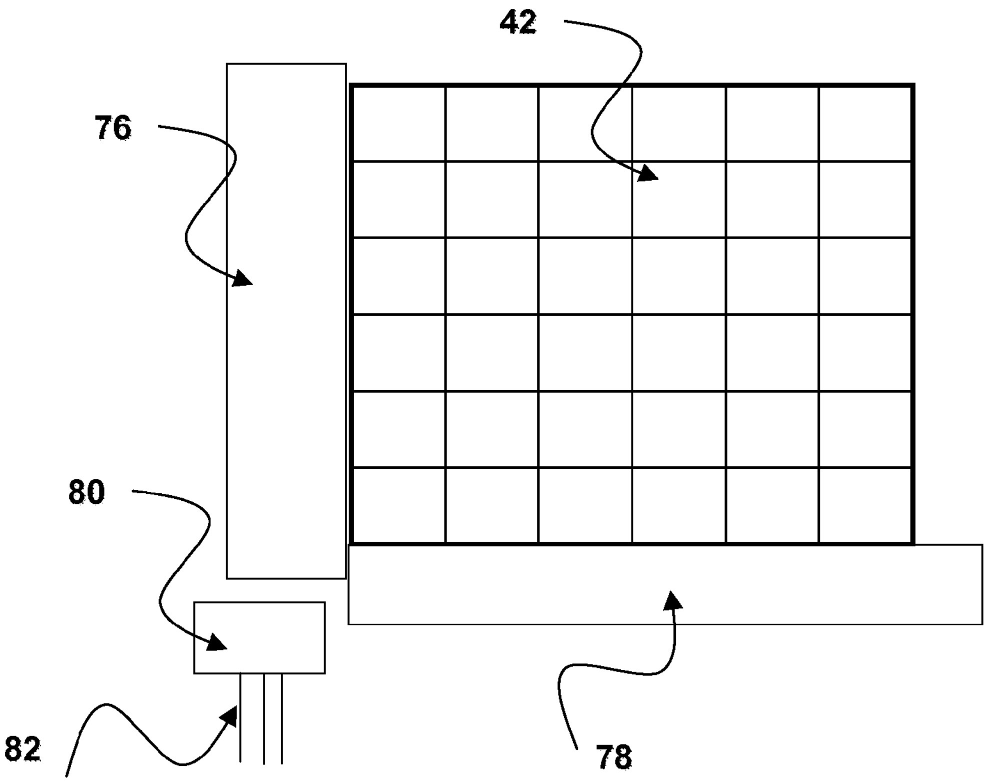
FIGURE 13: PRIOR ART
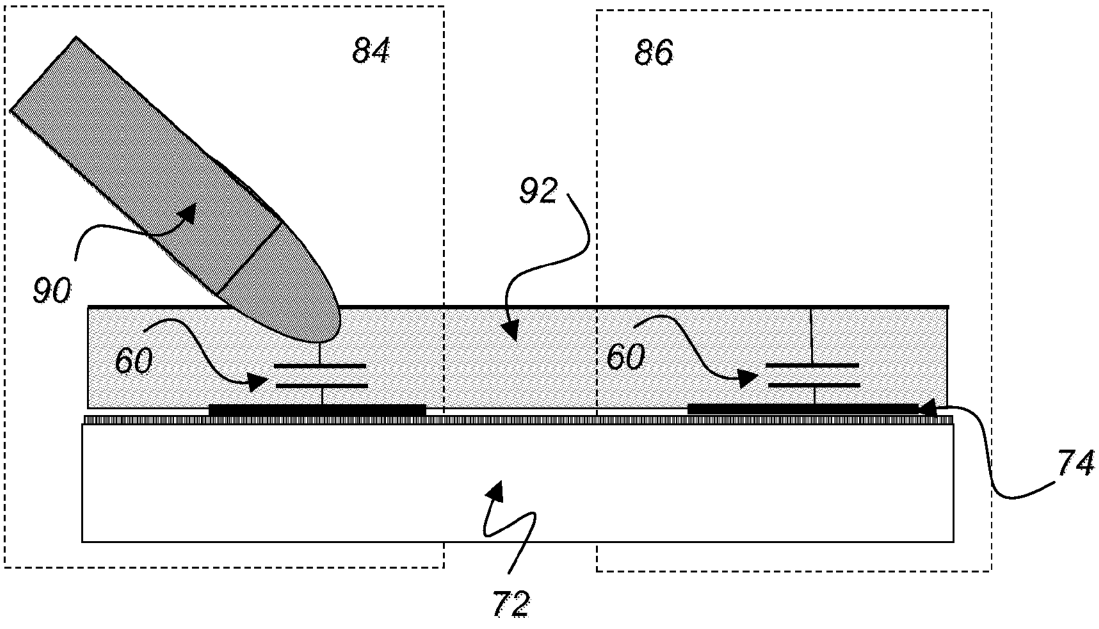
FIGURE 14: PRIOR ART

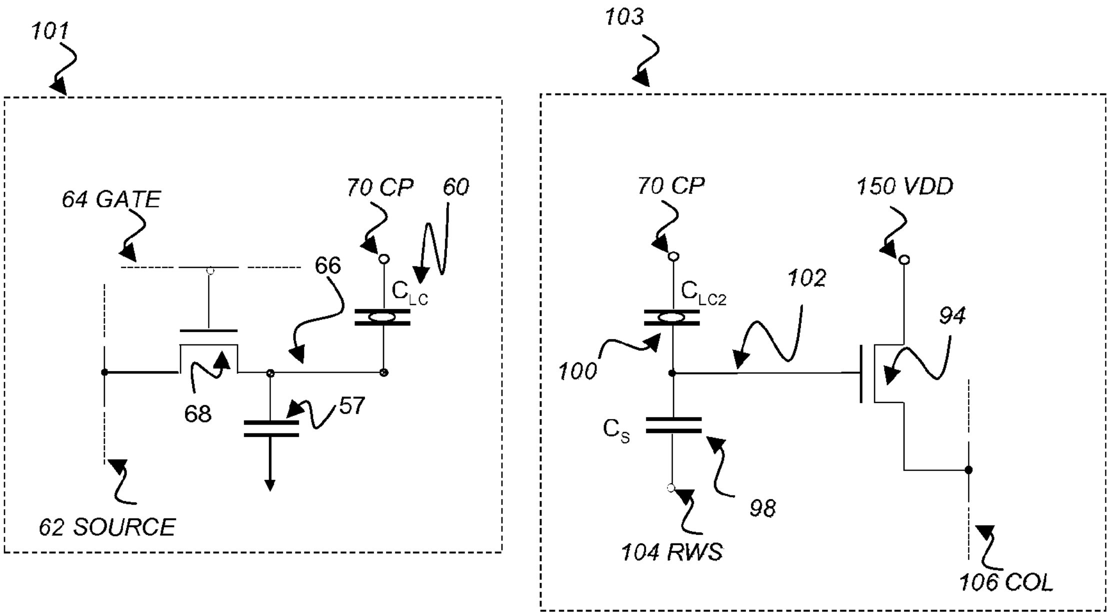
FIGURE 15: PRIOR ART
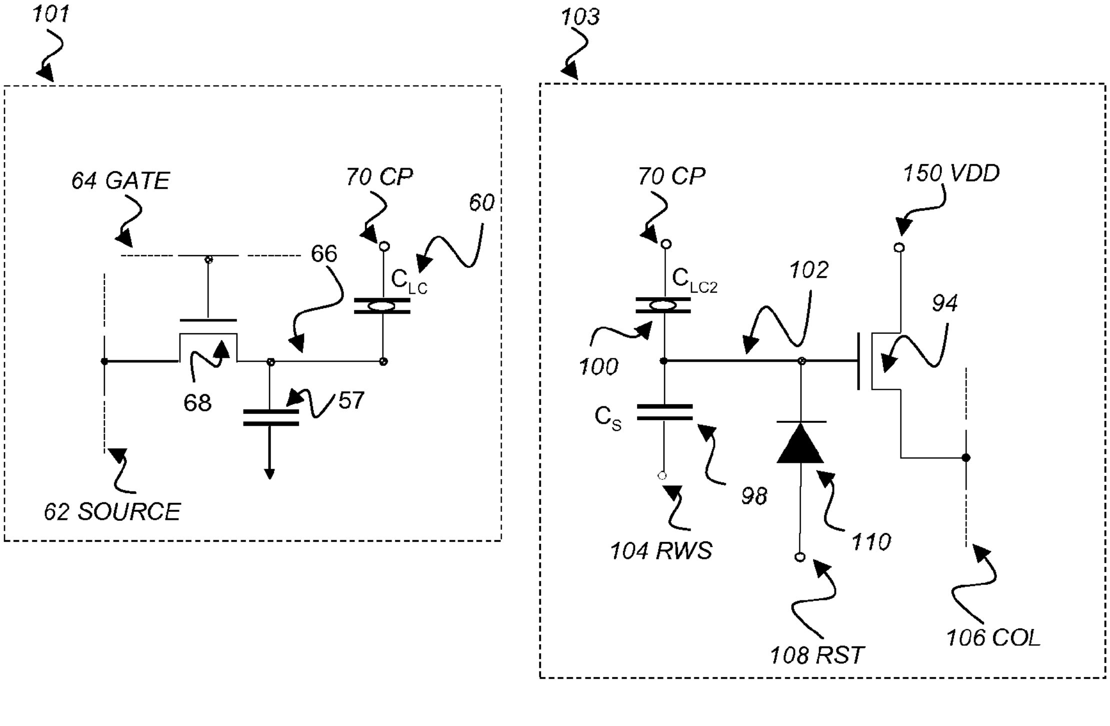
FIGURE 16: PRIOR ART

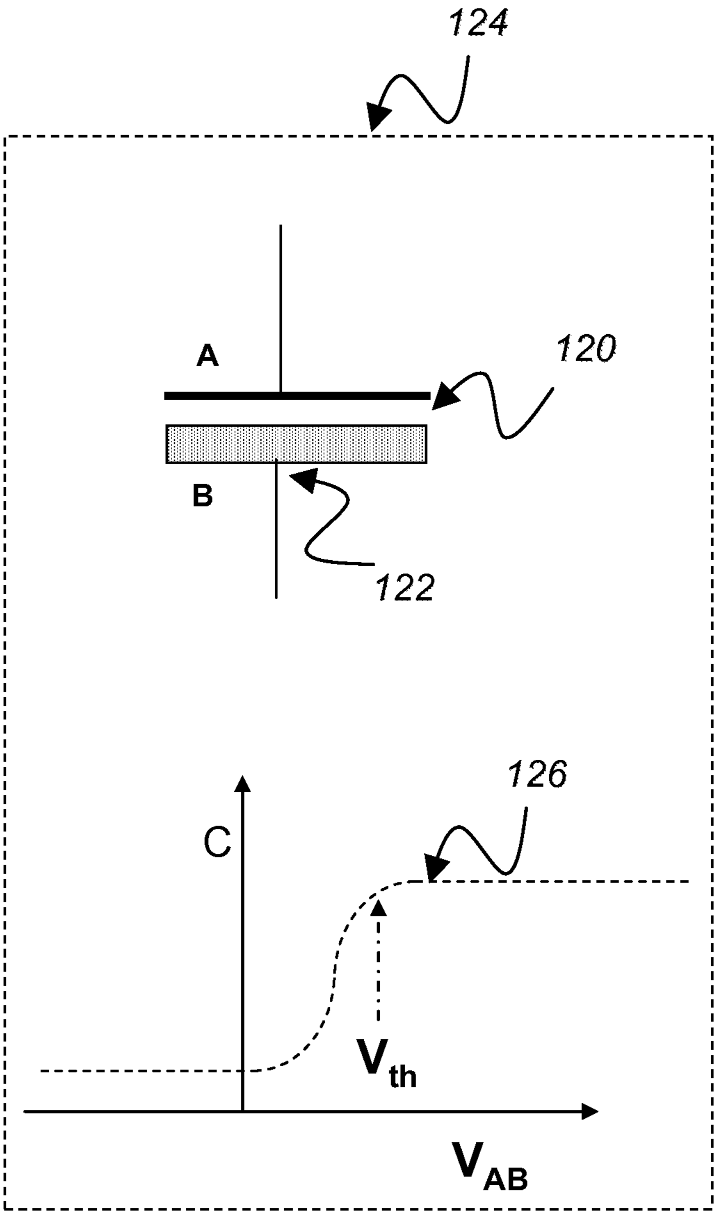
FIGURE 17: PRIOR ART

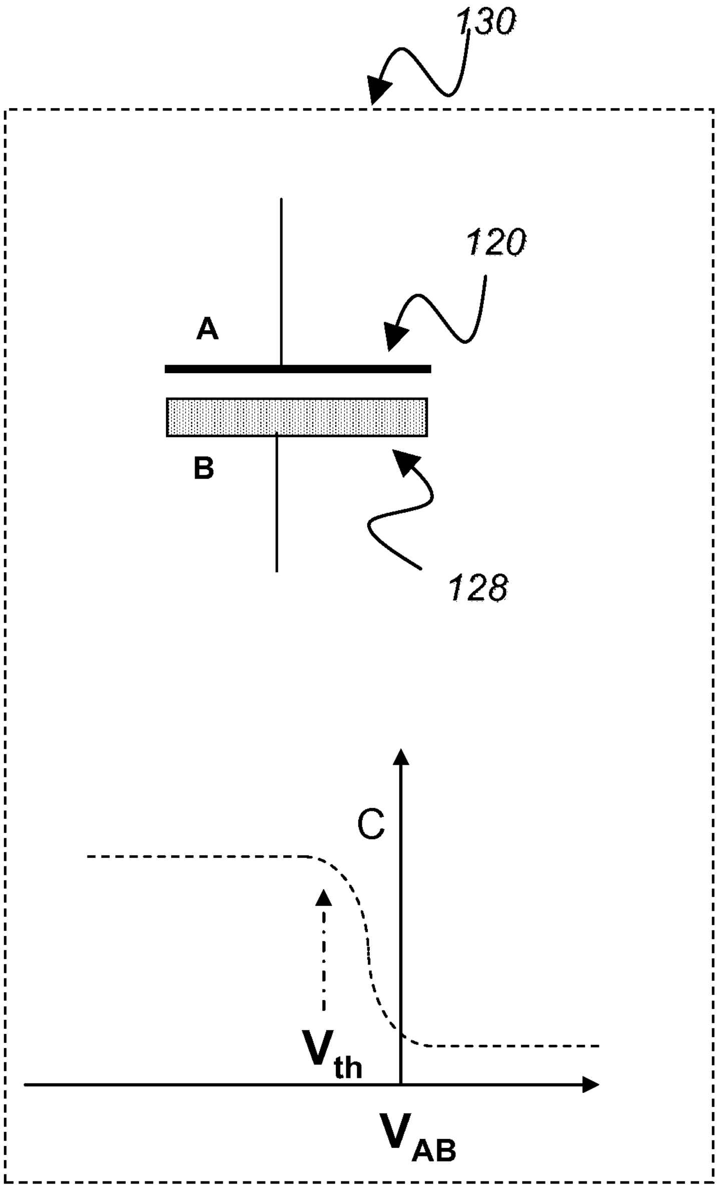
FIGURE 18: PRIOR ART

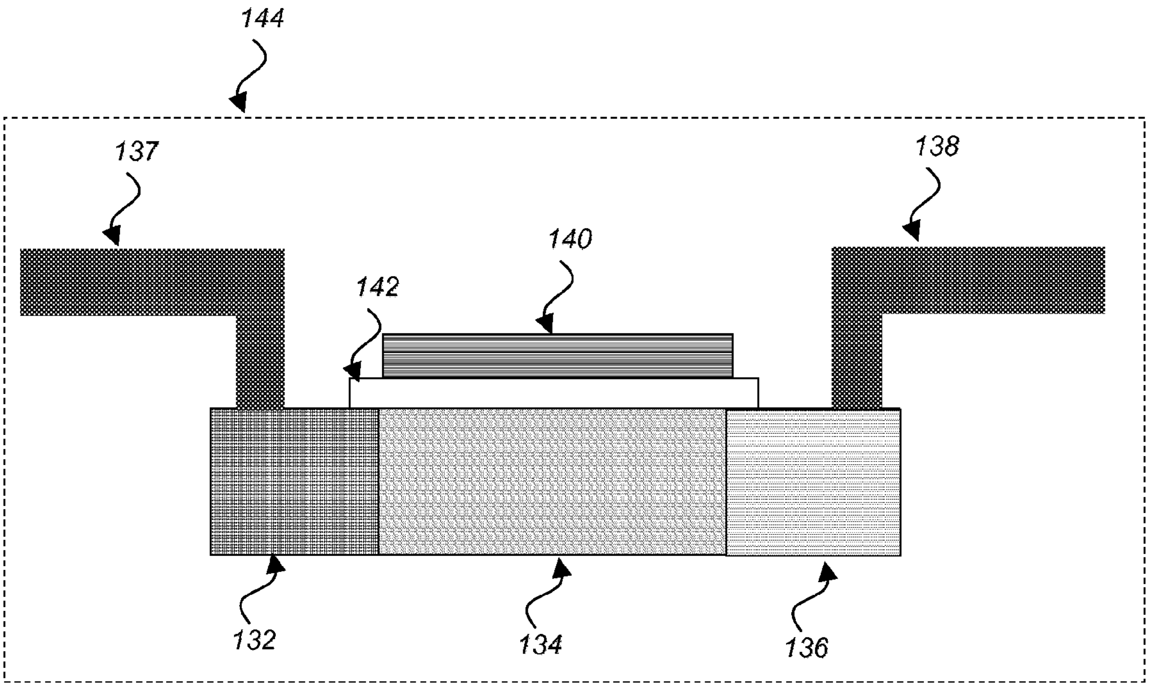
FIGURE 19: PRIOR ART
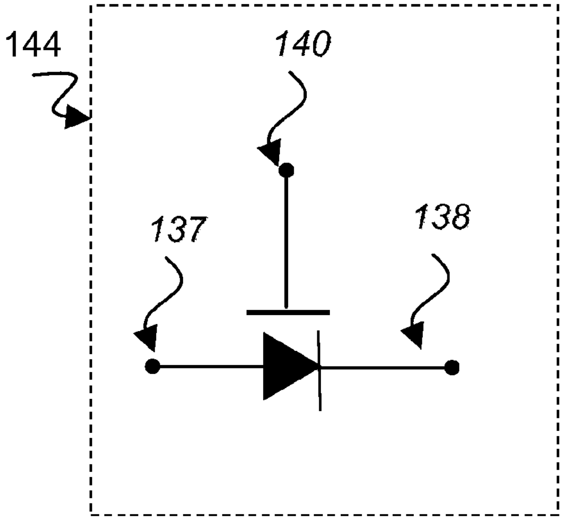
FIGURE 20: PRIOR ART

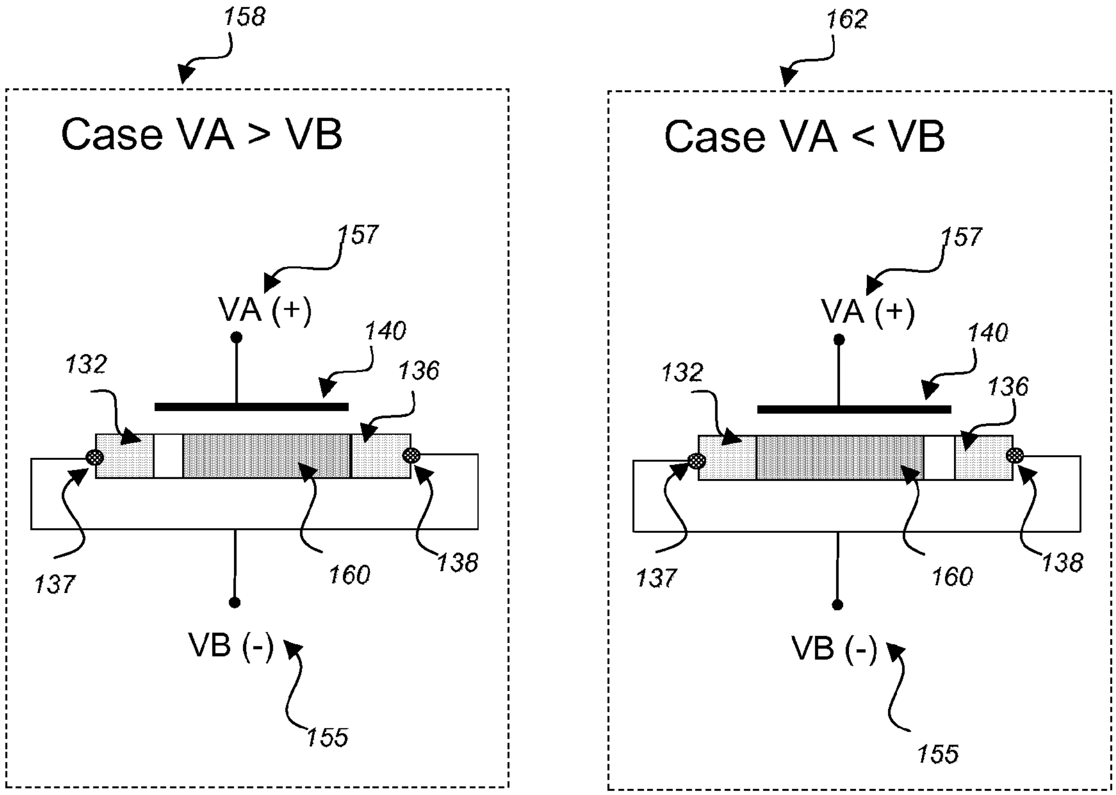
FIGURE 21: PRIOR ART

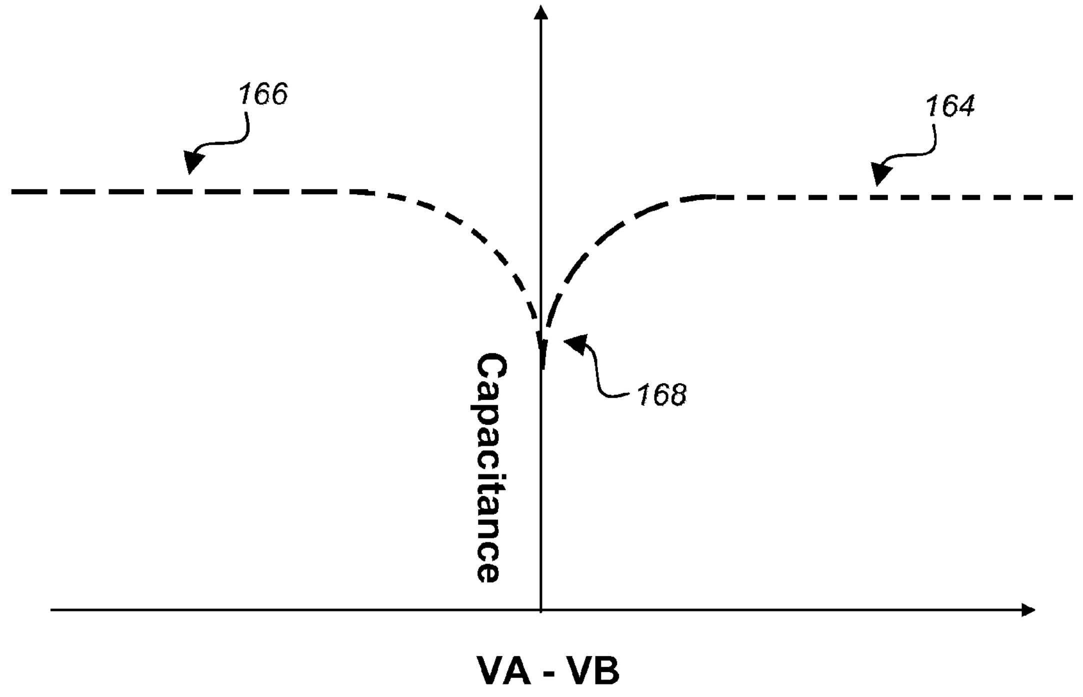
FIGURE 22: PRIOR ART
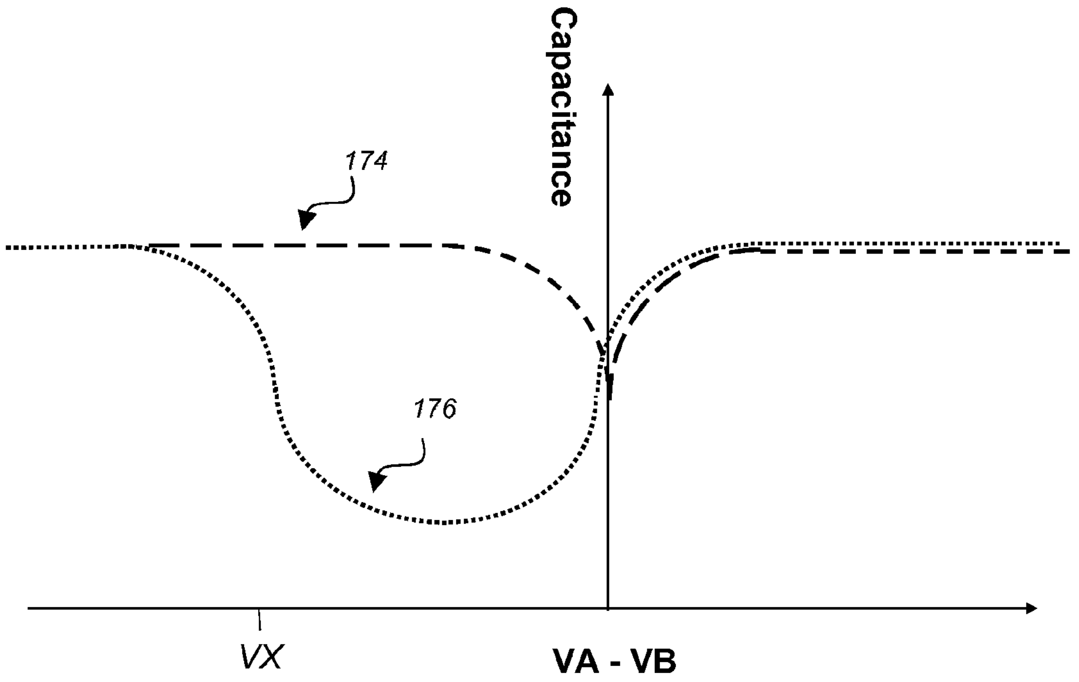
FIGURE 23: PRIOR ART

ARRAY ELEMENT CIRCUIT AND ACTIVE MATRIX DEVICE

TECHNICAL FIELD

The present invention relates to active matrix arrays and elements thereof. In a particular aspect, the present invention relates to digital microfluidics, and more specifically to AM-EWOD. Electrowetting-On-Dielectric (EWOD) is a known technique for manipulating droplets of fluid on an array. Active Matrix EWOD (AM-EWOD) refers to implementation of EWOD in an active matrix array, for example by using thin film transistors (TFTs).

BACKGROUND ART

FIG. 1 shows a liquid droplet 4 in contact with a solid surface 2 and in static equilibrium. The contact angle θ 6 is defined as shown in FIG. 1, and is determined by the balancing of the surface tension components between the solid-liquid ($\gamma_{SL}$ 8), liquid-gas ($\gamma_{LG}$ 10) and solid gas ($\gamma_{SG}$ 12) interfaces, as shown, such that:

$$\cos\theta = \frac{\gamma_{SG} - \gamma_{SL}}{\gamma_{LG}} \quad \text{(equation 1)}$$

The contact angle θ is thus a measure of the hydrophobicity of the surface. Surfaces may be described as hydrophilic if θ<90 degrees or hydrophobic if θ>90 degrees, and as more or less hydrophobic/hydrophilic according to the difference between the contact angle and 90 degrees. FIG. 2 shows a liquid droplet 4 in static equilibrium on hydrophilic 14 and hydrophobic 16 material surfaces with respective contact angles θ 6.

FIG. 3 shows the case where a droplet straddles two regions of different hydrophobicity (e.g., the hydrophobic surface 16 and the hydrophilic surface 14). In this case the situation is non-equilibrium and in order to minimise the potential energy the droplet will move laterally towards the region of greater hydrophilicity. The direction of motion is shown as 18.

If the droplet consists of an ionic material, it is well known that it is possible to change the hydrophobicity of the surface by the application of an electric field. This phenomenon is termed electrowetting. One means for implementing this is using the method of electrowetting on dielectric (EWOD), shown in FIG. 4.

A lower substrate 25 has disposed upon it a conductive electrode 22, with an insulator layer 20 deposited on top of that. The insulator layer 20 separates the conductive electrode 22 from the hydrophobic surface 16 upon which the droplet 4 sits. By applying a voltage V to the conductive electrode 22, the contact angle θ 6 can be adjusted. An advantage of manipulating contact angle θ 6 by means of EWOD is that the power consumed is low, being just that associated with charging and discharging the capacitance of the insulator layer 20.

FIG. 5 shows an alternative and improved arrangement whereby a top substrate (counter-substrate) 36 is also supplied, containing an electrode 28 coated with a hydrophobic layer 26. A voltage V2 may be applied to the electrode 28 such that the electric field at the interfaces of the liquid droplet 4 and hydrophobic layer 26 and substrate 16 is a function of the difference in potential between V2 and V. A spacer 32 may be used to fix the height of the channel layer in which the droplet 4 is constrained. In some implementations the channel volume around the droplet 4 may be filled by a non-ionic liquid, e.g. oil 34. The arrangement of FIG. 5 is advantageous compared to that of FIG. 1 for two reasons: Firstly it is possible to generate larger and better controlled electric fields at the surfaces where the liquid droplet contacts the hydrophobic layer. Secondly the liquid droplet is sealed within the device, preventing loss due to evaporation etc.

The above background art is all well known and a more detailed description can be found in standard textbooks, e.g. "Introduction to Microfluidics", Patrick Tabeling, Oxford University Press, ISBN 0-19-856864-9, section 2.8.

U.S. Pat. No. 6,565,727 (Shenderov, issued May 20, 2003) discloses a passive matrix EWOD device for moving droplets through an array. The device is constructed as shown in FIG. 6. The conductive electrode of the lower substrate 25 is patterned so that a plurality of electrodes 38 (e.g., 38A and 38B) are realised. These may be termed the EW drive elements. The term EW drive element may be taken in what follows to refer both to the electrode 38 associated with a particular array element, and also to the node of an electrical circuit directly connected to this electrode 38. By applying different voltages, termed the EW drive voltages, (e.g. V and V3) to different electrodes (e.g. drive elements 38A and 38B), the hydrophobicity of the surface can be controlled, thus enabling droplet movement to be controlled.

U.S. Pat. No. 6,911,132 (Pamula et al, issued Jun. 28, 2005) discloses an arrangement, shown in FIG. 7, whereby the conductive layer 22 on the lower substrate 25 is patterned to form a two dimensional array 42. By the application of time dependent voltage pulses to some or all of the different drive elements it is thus possible to move a liquid droplet 4 though the array on a path 44 that is determined by the sequence of the voltage pulses. U.S. Pat. No. 6,565,727 further discloses methods for other droplet operations including the splitting and merging of droplets and this mixing together of droplets of different materials. In general the voltages required to perform typical droplet operations are relatively high. Values in the range 20-60V are quoted in prior art (e.g. U.S. Pat. No. 7,329,545 (Pamula et al., issued Feb. 12, 2008), Lab on a Chip, 2002, Vol. 2, pages 96-101). The value required depends principally on the technology used to create the insulator and hydrophobic layers.

U.S. Pat. No. 7,255,780 (Shenderov, issued Aug. 14, 2007) similarly discloses a passive matrix EWOD device used for carrying out a chemical or biochemical reaction by combining droplets of different chemical constituents.

It may be noted that it is also possible, albeit generally not preferred, to implement an EWOD system to transport droplets of oil immersed in an aqueous ionic medium. The principles of operation are very similar to as already described, with the exception that the oil droplet is attracted to the regions where the conductive electrode is held at low potential.

When performing droplet operations it is in general very useful to have some means of sensing droplet position, size and constitution. This can be implemented by a number of means. For example an optical means of sensing may be implemented by observing droplet positions using a microscope. A method of optical detection using LEDs and photosensors attached to the EWOD substrate is described in Lab Chip, 2004, 4,310-315.

One particularly useful method of sensing is measuring the electrical impedance between an electrode 38 of the lower (patterned) conductive electrode 22 and the electrode 28 of the top substrate. FIG. 8 shows an approximate circuit representation 52 of the impedance in the case where a droplet 4 is present. A capacitor 46 representing the capacitance C, of the any insulator layers (including the hydrophobic layers) is in series with the impedance of the droplet 4 which can be modeled as a resistor 50 with resistance $R_{drop}$ in parallel with a capacitor 48 with capacitance $C_{drop}$. FIG. 9 shows the corresponding circuit representation 56 in the case where there is no droplet present. In this instance the impedance is that of the insulator layer capacitor 46 in series with a capacitor 54 representing the capacitance $C_{gap}$ of the cell gap. Since the overall impedance of this arrangement has no real (i.e. resistive) component, the total impedance can be represented as a frequency dependent capacitor of value $C_L$.

FIG. 10 shows schematically the dependence of $C_L$ with frequency in the cases where a droplet 4 is present (represented by dashed line 52) and where a droplet 4 is absent (represented by solid line 56). It can thus be readily appreciated that by measuring the impedance it is possible to determine whether or not a droplet 4 is present at a given node. Furthermore the value of the parameters $C_{drop}$ and $R_{drop}$ are a function of the size of the droplet 4 and the conductivity of the droplet 4. It is therefore possible to determine information relating to droplet size and droplet constitution by means of a measurement of capacitance. Sensors and Actuators B, Vol. 98 (2004) pages 319-327 describes a method for measuring droplet impedance by connecting external PCB electronics to an electrode in an EWOD array. However a disadvantage of this method is that the number of array elements at which impedance can be sensed is limited by the number of connections that can be supplied to the device. Furthermore this is not an integrated solution with external sensor electronics being required. The paper also describes how measured impedance can be used to meter the size of droplets and how droplet metering can be used to accurately control the quantities of reagents of chemical or biochemical reactions performed using an EWOD device. Impedance measurements at one or more locations could also be used for any of the following:

- Monitor the position of droplets within an array
- Determining the position of droplets within the array as a means of verifying the correct implementation of any of the previously droplet operations
- Measuring droplet impedance to determine information regarding drop constitution, e.g. conductivity.
- Measuring droplet impedance characteristics to detect or quantify a chemical or biochemical reaction.

EWOD devices have been identified as a promising platform for Lab-on-a-chip (LoaC) technology. LoaC technology is concerned with devices which seek to integrate a number of chemical or biochemical laboratory functions onto a single microscopic device. There exists a broad range of potential applications of this technology in areas such as healthcare, energy and material synthesis. Examples include bodily fluid analysis for point-of-care diagnostics, drug synthesis, proteomics, etc.

A complete LoaC system could be formed, for example, by an EWOD device to other equipment, for example a central processing unit (CPU) which could be configured to perform one or more multiple functions, for example:

- Supply voltage and timing signals to the AM-EWOD
- Analyse sensor data returned from the AM-EWOD
- Store in memory programmed data and/or sensor data
- Perform sensor calibration operations upon demand and store sensor calibration information in memory
- Process sensor data received from the AM-EWOD, including making adjustments based on saved calibration data
- Adjust and control the voltage levels and timings of sensor control signals
- Send digital or analogue data to the AM-EWOD for implementing droplet operations
- Send digital or analogue data to the AM-EWOD for implementing droplet operations whose content depends on measured sensor output data
- Adjust the voltage levels of the signals written to the EW drive electrodes in accordance with measured sensor output data.

Thin film electronics based on thin film transistors (TFTs) is a very well known technology which can be used, for example, in controlling Liquid Crystal (LC) displays. TFTs can be used to switch and hold a voltage onto a node using the standard display pixel circuit shown in FIG. 11. The pixel circuit consists of a switch transistor 68, and a storage capacitor 57. By application of voltage pulses to the source addressing line 62 and gate addressing line 64, a voltage $V_{write}$ can be written to the write node 66 and stored in the pixel. By applying a different voltage to the electrode of the counter-substrate CP 70, a voltage is thus maintained across the liquid crystal capacitance 60 within the pixel.

Many modern displays use an Active Matrix (AM) arrangement whereby a switch transistor is provided in each pixel of the display. Such displays often also incorporate integrated driver circuits to supply voltage pulses to the row and column lines (and thus program voltages to the pixels in an array). These are realised in thin film electronics and integrated onto the TFT substrate. Circuit designs for integrated display driver circuits are very well known. Further details on TFTs, display driver circuits and LC displays can be found in standard textbook, for example "Introduction to Flat Panel Displays", (Wiley Series in Display Technology, WileyBlackwell, ISBN 0470516933).

U.S. Pat. No. 7,163,612 (Sterling et al., issued Jan. 16, 2007) describes how TFT-based electronics may be used to control the addressing of voltage pulses to an EWOD array using circuit arrangements very similar to those employed in AM display technologies. FIG. 12 shows the approach taken. In contrast with the EWOD device shown in FIG. 6, the lower substrate 25 is replaced by a TFT substrate 72 having thin film electronics 74 disposed upon it. The thin film electronics 74 are used to selectively program voltages to the patterned conductive layer 22 used for controlling electrowetting. It is apparent that the thin film electronics 74 can be realised by a number of well known processing technologies, for example silicon-on-insulator (SOI), amorphous silicon on glass or low temperature polycrystalline silicon (LTPS) on glass.

Such an approach may be termed "Active Matrix Electrowetting on Dielectric" (AM-EWOD). There are several advantages in using TFT-based electronics to control an EWOD array, namely:

- Driver circuits can be integrated onto the AM-EWOD substrate. An example arrangement is shown in FIG. 13. Control of the EWOD array 42 is implemented by means of integrated row driver 76 and column driver 78 circuits. A serial interface 80 may also be provided to process a serial input data stream and write the required voltages to the array 42. The number of connecting wires 82 between the TFT substrate 72 (FIG. 12) and external drive electronics, power supplies etc. can be made relatively few, even for large array sizes.
- TFT-based electronics are well suited to the AM-EWOD application. They are cheap to produce so that relatively large substrate areas can be produced at relatively low cost.
- It is possible to incorporate TFT-based sensing into Active Matrix controlled arrays. For example US20080085559 describes a TFT based active matrix bio-sensor utilising cantilever based arrays.

A further advantage of using TFT based electronics to control an AM-EWOD array is that, in general, TFTs can be designed to operate at much higher voltages than transistors fabricated in standard CMOS processes. However the large AM-EWOD programming voltages (20-60V) can in some instances still exceed the maximum voltage ratings of TFTs fabricated in standard display manufacturing processes. To some extent it is possible to modify the TFT design to be compatible with operation at higher voltages, for example by increasing the device length and/or adding Gate-Overlap-Drain (GOLD) or Lightly Doped Drain (LDD) structures. These are standard techniques for improving Metal-On-Semiconductor (MOS) device reliability which can be found described, for example, in "Hot Carrier Effects in MOS Devices", Takeda, Academic Press Inc., ISBN 0-12-682240-9, pages 40-42. However such modifications to device design may impair the TFT performance. For example, structural modifications to improve reliability may increase device self resistance and inter-terminal capacitances. The effects of this are particularly deleterious for devices which are required to operate at high speed or to perform analogue circuit functions. It is therefore desirable to restrict the use of modified high voltage devices to only those functions for which a high voltage capability is necessary, and to design driver circuits such that as few devices as possible are required to operate at the highest voltages.

Fluid manipulation by means of electrowetting is also a well known technique for realizing a display. Electronic circuits similar or identical to those used in conventional Liquid Crystal Displays (LCDs) may be used to write a voltage to an array of EW drive electrodes. Coloured droplets of liquid are located at the EW drive electrodes and move according the programmed EW drive voltage. This in turn influences the transmission of light through the structure such that the whole structure functions as a display. An overview of electrowetting display technology can be found in "Invited Paper: Electro-wetting Based Information Displays", Robert A. Hayes, SID 08 Digest pp 651-654.

In recent years there has been much interest in realising AM displays with an array based sensor function. Such devices can be used, for example as user input devices, e.g. for touch-screen applications. One such method for user interaction is described in US20060017710 (Lee et al., published Jan. 26, 2006) and shown in FIG. 14. When the surface of the device is touched, for example by means of a fingertip or a stylus 90, the liquid crystal layer 92 is compressed in the vicinity of the touch. Integrated thin film electronics 74 disposed on the TFT substrate 72 can be used to measure the change in capacitance 60 of the LC layer and thus measure the presence 84 or absence 86 of touch. If the thin film electronics 74 are of sufficient sensitivity it is also possible to measure the pressure with which the surface is touched.

U.S. Pat. No. 7,163,612 noted above also describes how TFT-based sensor circuits may be used with an AM-EWOD, e.g. to determine drop position. In the arrangement described there are two TFT substrates, the lower one being used to control the EWOD voltages, and the top substrate being used to perform a sensor function.

A number of TFT based circuit techniques for writing a voltage to a display pixel and measuring the capacitance at the pixel are known. US20060017710 discloses one such an arrangement. The circuit is arranged in two parts which are not directly connected electrically, shown FIG. 15. The operation of the voltage write portion 101 of the pixel circuit is identical to a standard display pixel circuit as has already been described in relation to FIG. 11. The operation of the sensor portion 103 of the pixel circuit is as now described. For the sensor array row being sensed, a voltage pulse is supplied to a sensor row select line RWS 104. The potential of the sense node $V_{sense}$ 102 will then increase by an amount that depends on the relative values of the LC capacitance $C_{LC2}$ 100 and the fixed reference capacitor $C_S$ 98 (and also on parasitic capacitances including those associated with the transistor 94). The potential of the sense node 102 can be measured as follows. Transistor 94 in combination with a load device (not shown) acts as standard source follower arrangement as is very well known, e.g. "CMOS Analog Circuit Design", Allen and Holberg, ISBN-10: 0195116441, section 5.3. Since the value of the capacitor $C_S$ 98 is known, measurement of column output voltage at the sensor output line COL 106 is thus a measure of the LC capacitance. A notable feature of the whole arrangement is that the write node 66 and the sense node 102 are not electrically connected. Direct connection is not necessary or desirable since detection of touch does not require the LC capacitance of the entire pixel to be measured, but instead only the capacitance of a sample portion of it.

A disadvantage of the above circuit is that there is no provision of any DC current path to the sense node 102. As a result the potential of this node may be subject to large pixel-to-pixel variations, since fixed charge at this node created during the manufacturing process may be variable from pixel-to-pixel. An improvement to this circuit is shown in FIG. 16. Here an additional diode 110 is connected to the sense node 102. The potential at the anode of the diode RST 108 is maintained such that the diode 110 is reversed biased. This potential may be taken high to forward bias the diode 110 for a brief time period before the voltage pulse is applied to the sensor row select line 104. The effect of the voltage pulse applied to reset line RST 108 is to reset the potential of the sense node 102 to an initial value which can be very well controlled. This circuit arrangement therefore has the advantage of reduced pixel-pixel variability in the measured output voltage.

In general it may be noted that in this application, both the value of the LC capacitance and the change in capacitance associated with touch are very small (of order a few fF). One consequence of this is that reference capacitor $C_S$ 98 can also be made very small (typically a few fF). The small LC capacitance also makes changes difficult to sense. British applications GB 0919260.0 and GB 0919261.8 describe means of in-pixel amplification of the small signals sensed. However in an EWOD device the capacitances presented by droplets are much larger and amplification is generally not required.

As well as implementing sensor pixel circuits onto a TFT substrate it is also well known to integrate sensor driver circuits and output amplifiers for the readout of sensor data onto the same TFT substrate, as described for example for an imager-display in "A Continuous Grain Silicon System LCD with Optical Input Function", Brown et al. IEEE Journal of Solid State Circuits, Vol. 42, Issue 12, December 2007 pp 2904-2912. The same reference also describes how calibration operations may be performed to remove fixed pattern noise from the sensor output.

There are several methods that may be used to form a capacitor circuit element in a thin film manufacturing process as would be used for example to manufacture a display. Capacitors can be formed for example using the source and gate metal layers as the plates, these layers being separated by an interlayer dielectric. In situations where it is important to keep the physical layout footprint of the capacitor it is often convenient to use a metal-oxide-semiconductor (MOS) capacitor as described in standard textbooks, e.g. Semiconductor Device Modeling for VLSI, Lee et al., Prentice-Hall, ISBN 0-13-805656-0, pages 191-193. A disadvantage of MOS capacitors is that the capacitance becomes a function of the terminal biases if the potentials are not arranged so that the channel semiconductor material is completely in accumulation. FIG. 17 shows at 124 the typical characteristics of a MOS capacitor 120 where the semiconductor material 122 is doped n-type. Plate A of the MOS capacitor 120 is formed by a conductive material (e.g. the gate metal) and plate B is the n-doped semiconductor material 122. The capacitance is shown in dotted line 126 as a function of the difference in voltage (bias voltage $V_{AB}$) between the two plates A and B. Above a certain bias voltage $V_{th}$ corresponding to approximately the threshold voltage of the n-type doped semiconductor material 122, the semiconductor material 122 is in accumulation and the capacitance is large and independent of voltage. If $V_{AB}$ is less than $V_{th}$ the capacitance becomes smaller and voltage dependent as the n-type semiconductor material 122 becomes depleted of charge carriers.

FIG. 18 at 130 shows the corresponding situation where in this case the semiconductor material 128 forming plate B of the MOS capacitor 120 is doped p-type. In this case the maximum capacitance is obtained when $V_{AB}$ is below the threshold voltage $V_{th}$ and the channel semiconductor material 128 is in accumulation.

A known lateral device type which can be realised in thin film processes is a gated P-I-N diode 144, shown FIG. 19. The gated P-I-N diode is formed from a layer of semiconductor material consisting of a p+ doped region 132, a lightly doped region 134 which may be either n-type or p-type, and an n-F region 136. Electrical connections, e.g. with metal, are made to the p+ and n+ regions (132 and 136) to respectively form the anode terminal 137 and cathode terminal 138 of the device 144. An electrically insulating layer 142 is disposed over some or all of the lightly doped region 134, and a conductive layer forms the third gate terminal 140 of the device 144 denoted the gate terminal. Further description and explanation of the operation of such a device can be found in "High performance gated lateral polysilicon PIN diodes", Stewart and Hatalis, Solid State Electronics, Vol. 44, Issue 9, p 1613-1619. FIG. 20 shows a circuit symbol which may be used to represent the gated P-I-N diode 144 and the three connecting terminals 137, 138 and 140 corresponding to the anode, cathode, and gate, respectively.

The gated P-I-N diode 144 may be configured as a type of MOS capacitor by connecting the anode and cathode terminals together to form one terminal of the capacitor, and by using the gate terminal 140 to form the other terminal.

By connecting the gated P-I-N diode 144 in this way it functions in a similar way to the MOS capacitor as already described, with the important difference that most of the channel region remains accumulated with carriers almost regardless of the voltage between the terminals. The operation of the gated P-I-N diode 144 connected in this way is illustrated in FIG. 21. In the case represented at 158 where the voltage potential VA 157 supplied to the gate terminal 140 exceeds the voltage potential VB 155 applied to the anode terminal 137 and cathode terminal 138 (plus the channel material threshold voltage), the majority of the channel 160 (the lightly doped region 134 in FIG. 19) becomes accumulated with negatively charged carriers (electrons) supplied from the cathode terminal 138 of the gated P-I-N diode 144. The capacitance between the gate terminal 140 and the (connected together) anode terminal 137 and cathode terminal 138 then approximates to that of a MOS capacitor in accumulation. Similarly, in the case represented at 162 where VA<VB, the majority of the channel 160 becomes accumulated with positive charge carriers (holes) supplied from the anode terminal 137 of the gated P-I-N diode 144. The capacitance between the gate terminal 140 and the anode/cathode terminals 137/138 again approximates to that of a MOS capacitor in accumulation. FIG. 22 shows schematically the capacitance versus voltage behaviour of the gated P-I-N diode 144 when connected as shown in FIG. 21. It can be seen that at both positive 164 and negative 166 bias voltages $V_{AB}$ (where $V_{AB}$=VA−VB), the gated P-I-N diode 144 behaves like a MOS capacitor in accumulation. A small dip in the capacitance 168 appears as indicated around the threshold voltage of the material within the channel 160 (region 134 in FIG. 19).

It is also possible to form a voltage dependent capacitor from a gated P-I-N diode 144, by connecting a bias voltage to the anode terminal 137 of the device relative to the cathode terminal 138. The bias applied, −VX, should be chosen such that the gated P-I-N diode 144 remains reverse biased. FIG. 23 shows schematically the capacitance of the gated P-I-N diode 144 in the case where a bias voltage is applied compared to the case where a bias voltage is not applied. In the case represented by dashed line 174, the anode terminal 137 and cathode terminal 138 are connected together. In the case represented by dotted line 176, a bias voltage −VX is applied to the anode terminal 137 relative to the cathode terminal 138. As is shown, the manner in which the capacitance varies as a function of the voltage difference between the anode terminal and the cathode terminal may be modified with application of the bias voltage −VX.

In both AM-EWOD and AM displays a number of possible alternative configurations for storing a programmed write voltage within a pixel are possible. For example an SRAM cell can be used to store the programmed voltage as is very well known and described in standard text books, for example "VLSI Design Techniques for Analog and Digital Circuits", Geiger et al, McGraw-Hill, ISBN 0-07-023253-9, Section 9.8.

An alternative technology for implementing droplet microfluidics is dielectrophoresis. Dielectrophoresis is a phenomenon whereby a force may be exerted on a dielectric particle by subjecting it to a varying electric field. An introduction may be found in "Introduction to Microfluidics", Patrick Tabeling, Oxford University Press (January 2006), ISBN 0-19-856864-9, pages 211-214. "Integrated circuit/microfluidic chip to programmably trap and move cells and droplets with dielectrophoresis", Thomas P Hunt et al, Lab Chip, 2008, 8,81-87 describes a silicon integrated circuit (IC) backplane to drive a dielectropheresis array for digital microfluidics. This reference also includes an array-based integrated circuit for supplying drive waveforms to array elements.

SUMMARY OF INVENTION

The invention relates to an AM-EWOD device with an array based integrated impedance sensor for sensing the location, size and constitution of ionic droplets. The preferred pixel circuit architecture utilises an AC coupled arrangement to write the EW drive voltage to the EW drive element and sense the impedance at the EW drive element.

The advantages of including an impedance sensor capability in an AM-EWOD device are as follows:

By measuring impedance at each array element in the AM-EWOD array it is possible to determine the location of droplets with the array.

By measuring the impedance of a given droplet, it is possible to determine the size of the droplet. An impedance sensor capability can thus be used for metering quantities of fluids used in chemical and/or biochemical reactions.

By measuring impedance at each array element it is possible to verify the correct execution of fluidic protocols, e.g. drop moving, drop splitting, drop actuation from a reservoir.

By use of circuit based techniques it is possible to determine information regarding droplet constitution, e.g. resistivity.

The advantages of integrating an impedance sensor capability into the AM-EWOD drive electronics are as follows:

By employing an active-matrix sensor arrangement, the impedance can be measured at a large number of points in an array almost simultaneously.

By integrating sensor drive circuitry and output amplifiers into the AM-EWOD drive electronics, the impedance can be measured at a large number of points in an array with only a small number of connections being required to be made between the AM-EWOD device and external drive electronics. This improves manufacturability and minimises cost compared to a passive matrix sensor arrangement, as in the prior art, where the impedance at each location in the array has to be connected individually.

An integrated impedance sensor capability requires few or no additional process steps or assembly cost in comparison to a standard AM-EWOD device.

The advantages of the AC coupled arrangement disclosed in the preferred embodiments for writing an EW drive voltage to the EW drive element and sensing the impedance at the EW drive element are as follows:

Only certain less performance-critical circuit components are required to withstand high voltages such as are required for the EW-drive voltage. This reduces layout footprint, improves reliability and improves circuit performance.

The sensor circuit can be arranged such that performing the sense operation does not destroy the EW-drive voltage written to the EW-drive element, and only disturbs it for a limited time during the sense operation The sensor circuit can be arranged such that the EW-drive voltage written to the EW-drive element is not degraded by any DC leakage paths through the sensor components added to the array element circuit.

According to an aspect of the invention, an array element circuit with an integrated impedance sensor is provided. The array element circuit includes an array element which is controlled by application of a drive voltage by a drive element; writing circuitry for writing the drive voltage to the drive element; and sense circuitry for sensing an impedance presented at the drive element.

According to another aspect, the array element is a hydrophobic cell having a surface of which the hydrophobicity is controlled by the application of the drive voltage by the drive element, and the sense circuitry senses the impedance presented at the drive element by the hydrophobic cell.

According to another aspect, the writing circuitry is configured to perturb the drive voltage written to the drive element; the sense circuitry is configured to sense a result of the perturbation of the drive voltage written to the drive element, the result of the perturbation being dependent upon the impedance presented at the drive element; and the sense circuitry includes an output for producing an output signal a value of which represents the impedance presented at the drive element.

In accordance with another aspect, the sense circuitry is AC coupled to the drive element.

In accordance with another aspect, the drive element includes a node between the hydrophobic cell and a capacitor which stores the written drive voltage; and the sense circuitry includes a sensor row select line connected to the capacitor, the sensor row select line serving to provide at least one pulse to the node via the capacitor in order to sense the impedance presented at the drive element.

In yet another aspect, the capacitor is formed by a gated diode.

According to another aspect, the sense circuitry comprises a sense node AC coupled to the drive element; and the sense circuitry further includes reset circuitry for resetting a voltage at the sense node prior to sensing the impedance presented at the drive element.

According to another aspect, the reset circuitry comprises a pair of diodes connected in series with the sense node therebetween and connected at opposite ends to corresponding reset lines.

In accordance with another aspect, the reset circuitry includes at least one transistor having a gate coupled to a reset line for selectively coupling the sense node to a reset potential.

In still another aspect, the array element circuit including a counter-substrate and the impedance presented at the drive element representing the impedance between the drive element and the counter-substrate.

According to another aspect, an active-matrix device is provided which includes a plurality of array element circuits arranged in rows and columns; a plurality of source addressing lines each shared between the array element circuits in corresponding same columns; a plurality of gate addressing lines each shared between the array element circuits in corresponding same rows; and a plurality of sensor row select lines each shared between the array element circuits in corresponding same rows. Each of the plurality of array element circuits includes an array element which is controlled by application of a drive voltage by a drive element; writing circuitry for writing the drive voltage to the drive element, the writing circuitry being coupled to a corresponding source addressing line and gate addressing line among the plurality of source addressing lines and gate addressing lines; and sense circuitry for sensing an impedance presented at the drive element, the sense circuitry being coupled to a corresponding sensor row select line.

In yet another aspect, the array elements are hydrophobic cells having a surface of which the hydrophobicity is controlled by the application of the drive voltage by the corresponding drive element, and the corresponding sense circuitry senses the impedance presented at the drive element by the hydrophobic cell.

According to another aspect, with respect to each of the plurality of array element circuits: the writing circuitry is configured to perturb the drive voltage written to the drive element; the sense circuitry is configured sense a result of the perturbation of the drive voltage written to the drive element, the result of the perturbation being dependent upon the impedance presented at the drive element; and the sense circuitry includes an output for producing an output signal a value of which represents the impedance presented at the drive element.

In another aspect, the device includes a plurality of sensor output lines each shared between the array element circuits in corresponding same columns, and the outputs of the plurality of array element circuits are coupled to a corresponding sensor output line.

With yet another aspect, each of the plurality of array element circuits the sense circuitry is AC coupled to the drive element.

In still another aspect, with respect to each of the plurality of array element circuits: the drive element includes a node between the hydrophobic cell and a capacitor which stores the written drive voltage; and the corresponding row select line is connected to the capacitor, the sensor row select line serving to provide at least one pulse to the node via the capacitor in order to sense the impedance presented at the drive element.

According to another aspect, with respect to each of the plurality of array element circuits: the sense circuitry comprises a sense node AC coupled to the drive element; and the sense circuitry further comprises reset circuitry for resetting a voltage at the sense node prior to sensing the impedance presented at the drive element.

According to another aspect, the device includes a counter-substrate shared by the array element circuits, and the impedance presented at the corresponding drive element representing the impedance between the corresponding drive element and the counter-substrate.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

In the annexed drawings, like references indicate like parts or features:

FIG. 1 shows prior art: the disposition of a droplet on a surface illustrating surface tensions and defining contact angle.

FIG. 2 shows prior art: the disposition of a droplet on hydrophobic and hydrophilic surfaces.

FIG. 3 shows prior art: the motion of a droplet on a surface that is partially hydrophobic and partially hydrophilic.

FIG. 4 shows prior art: an arrangement for implementing electrowetting-on-dielectric (EWOD).

FIG. 5 shows prior art: an improved arrangement for implementing electrowetting-on-dielectric using top and bottom substrates.

FIG. 6 shows prior art: a passive matrix EWOD device.

FIG. 7 shows prior art: lateral droplet movement through an EWOD device.

FIG. 8 shows prior art: a model for the impedance presented between an EWOD drive electrode and the conductive layer of the top substrate when a droplet is present.

FIG. 9 shows prior art: a model for the impedance presented between an EWOD drive electrode and the conductive layer of the top substrate when a droplet is absent.

FIG. 10 shows prior art: a graph of the imaginary component of the impedance as a function of frequency with a droplet present and with a droplet absent.

FIG. 11 shows prior art: the standard display pixel circuit.

FIG. 12 shows prior art: an active matrix EWOD device.

FIG. 13 shows prior art: an example AM-EWOD driver circuit arrangement.

FIG. 14 shows prior art: a touch input LC display device detecting touch by sensing the LC capacitance.

FIG. 15 shows prior art: a pixel circuit of an LC display having a capacitance sensor touch input capability.

FIG. 16 shows prior art: a pixel circuit of another LC display having a capacitance sensor touch input capability.

FIG. 17 shows prior art: the construction and operation of a MOS capacitor device where the semiconductor material is doped n-type.

FIG. 18 shows prior art: the construction and operation of a MOS capacitor device where the semiconductor material is doped p-type.

FIG. 19 shows prior art: a lateral gated P-I-N diode.

FIG. 20 shows prior art: a circuit symbol for a lateral gated diode.

FIG. 21 shows prior art: the operation of a gated diode connected such that the anode and cathode potentials are common, as utilised in a second embodiment of the invention.

FIG. 22 shows prior art: the capacitance versus voltage characteristic of the gated diode connected such that the anode and cathode potentials are common.

FIG. 23 shows prior art: a graph of the capacitance versus voltage characteristic of the gated diode when the anode and cathode terminals are connected together and when a potential difference –VX is applied between the anode and cathode terminals.

DESCRIPTION OF REFERENCE NUMERALS

Figure 24:
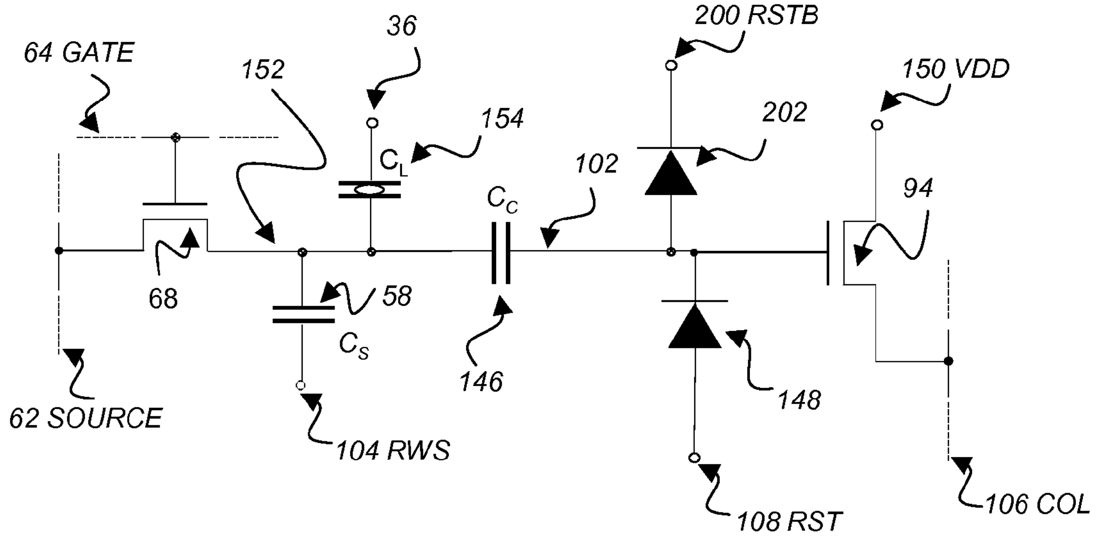
FIG. 24 shows a first embodiment of the invention.

2 solid surface
4 liquid droplet
6 contact angle theta
8 Solid-liquid interface surface tension
10 Liquid-gas interface surface tension
12 Solid-gas interface surface tension
14 Hydrophilic surface
16 Hydrophobic surface
18 Direction of motion of a droplet on a surface
20 Insulator layer
22 Conductive electrode
25 Lower substrate
26 Hydrophobic layer
28 Electrode (top substrate)
32 Spacer
34 Non ionic liquid (oil)
36 counter-substrate
38 Electrode-bottom substrate (Multiple electrodes (38A and 38B))
42 Two-dimensional array of electrodes
44 Path of droplet movement
46 Capacitance of insulator layers (Ci)
47 Intermediate node
48 Capacitive component of drop impedance $C_{drop}$
50 Resistive component of drop impedance $R_{drop}$
52 Impedance when droplet present
54 Capacitor representing cell gap capacitance $C_{gap}$
56 Impedance when droplet absent

57 Storage capacitor of display pixel circuit Cstore
58 Capacitor Cs
60 Liquid crystal capacitance
62 Source addressing line
64 Gate addressing line
66 Write node
68 Switch transistor of display circuit/used equivalently in the invention
70 Counter substrate CP
72 TFT substrate
74 Thin film electronics
76 Row driver
78 Integrated column driver
80 Serial interface
82 Connecting wires
84 LC capacitance being touched
86 LC capacitance not being touched
90 Fingertip or stylus
92 Liquid crystal layer
94 Transistor
98 Reference capacitor Cs
100 LC capacitance 2
102 Sense node
104 Sensor row select line RWS
106 Sensor output line COL
108 Reset line RST
110 Diode
120 MOS capacitor
122 semiconductor material
124 Characteristics of a MOS capacitor
126 Capacitance of MOS capacitor (n-type)
128 semiconductor material
130 Characteristics of MOS capacitor (p-type)
132 p+ region
134 Lightly doped region
136 n+ region
137 Anode terminal
138 Cathode terminal
140 Gate terminal
142 Electrically insulating layer
144 Gated P-I-N diode
146 Coupling capacitor Cc
148 Diode
150 Power supply VDD
152 EW drive electrode
154 Capacitive load element
155 Voltage potential VB
157 Voltage potential VA
158 Gated diode operation where VA>VB
160 Channel of gated diode device
162 Gated diode operation where VB>VA
164 Positive bias voltage Vab
166 Negative bias voltage Vab
168 Dip in gated diode capacitance
170 Dual purpose RST/RWS line
172 Bias supply VBR
174 Dashed line showing gated diode capacitance when anode and cathode connected
176 Dotted line showing gated diode capacitance at a reverse bias voltage
180 Row select pulse train (multiple pulses)
182 Row select pulse train (single pulse)
184 Power supply line VSS
186 p type Transistor T3
188 Diode
190 Capacitor Cs
192 Capacitor Cp
194 SRAM cell
196 Transistor 68
198 Sensor enable line SEN
200 Reset line RSTB
202 Diode
204 RWS/RSTB line
205 Transistor
206 Transistor
208 Power supply line VRST

DETAILED DESCRIPTION OF INVENTION

The first embodiment is shown in FIG. 24. This consists of an array element circuit for an AM-EWOD device with integrated impedance sensor. As with each of the embodiments of the invention described herein, a plurality of the described array elements are included in an AM display in an array of rows and columns with corresponding driver circuits similar to FIG. 13. Accordingly, additional detail regarding the otherwise conventional portions of the display have been omitted for sake of brevity.

Referring again to FIG. 24, the array element circuit includes the following elements:

A switch transistor 68
A capacitor $C_S$ 58
A coupling capacitor $C_C$ 146
A diode 148
A diode 202
A transistor 94

Connections supplied to the array element are as follows:

A source addressing line 62 which is shared between array elements in the same column
A gate addressing line 64 which is shared between array elements in the same row
A sensor row select line RWS 104 which is shared between array elements in the same row
A reset line RST 108 which is shared between array elements in the same row
A second reset line RSTB 200 which is shared between array elements in the same row
A power supply line VDD 150 which is common to all elements in the array
A sensor output line COL 106 which is shared between array elements in the same column Each array element contains an EW drive electrode 152 to which a voltage $V_{WRITE}$ can be programmed. Also shown is a load element represented by capacitor $C_L$ 154. The capacitor $C_L$ 154 specifically represents the impedance between the EW drive electrode 152 and the counter-substrate 36, and thus represents the impedance presented by the hydrophobic cell included in the array element. The value of capacitor $C_L$ 154 is dependent on the presence of, size of and constitution of any liquid droplet located at the hydrophobic cell within that particular array element within the array.

The circuit is connected as follows:

The source addressing line 62 is connected to the drain of transistor 68. The gate addressing line 64 is connected to the gate of transistor 68. The source of transistor 68 is connected to the EW drive electrode 152. The source addressing line 62, transistor 68, gate addressing line 64 and storage capacitor $C_S$ 58 make up writing circuitry for writing a drive voltage to the EW drive electrode 152 as will be further described herein. Capacitor $C_S$ 58 is connected between the EW drive electrode 152 and the sensor row select line RWS 104. Coupling capacitor $C_C$ 146 is connected between the EW drive electrode 152 and the gate of transistor 94. The anode of the diode 148 is connected to the reset line 108. The cathode of the diode 148 is connected to the gate of transistor 94 and to the anode of diode 202. The cathode of diode 202 is connected to the reset line RSTB 200. The drain of transistor 94 is connected to the VDD power supply line 150. The source of transistor 94 is connected to the sensor output line COL 106 shared between the array elements of the same column.

The operation of the circuit is as follows:

In operation the circuit performs two basic functions, namely (i) writing a voltage to the drive element comprising the EW drive electrode 152 so as to control the hydrophobicity of the hydrophobic cell within the array element; and (ii) sensing the impedance presented by the hydrophobic cell at the drive element including the EW drive electrode 152.

In order to write a voltage, the required write voltage $V_{WRITE}$ is programmed onto the source addressing line 62 via the column driver (e.g., 78 in FIG. 13). The write voltage $V_{WRITE}$ can be based on the voltage pattern to be written, for droplet control for example, or some other voltage such as for purposes of testing, calibration, etc., as will be appreciated. The gate addressing line 64 is then taken to a high voltage via the row driver (e.g., 76 in FIG. 13) such that transistor 68 is switched on. The voltage $V_{WRITE}$ is then written to the EW drive electrode 152 and stored on the capacitance present at this node, and in particular on capacitor $C_S$ 58 (which in general is substantially larger in capacitance value than coupling capacitor $C_C$ 146). The gate addressing line 64 is then taken to a low level via the row driver to turn off transistor 68 and complete the write operation.

In order to sense the impedance presented at the EW drive electrode 152 following the writing of the voltage $V_{WRITE}$, the sense node 102 is first reset.

Specifically, sense circuitry included within the control circuitry includes reset circuitry which performs the reset operation. The reset circuitry includes, for example, the diodes 148 and 202 connected in series with sense node 102 therebetween. As noted above, the opposite ends of the diodes 148 and 202 are connected to the reset lines RST 108 and RSTB 200, respectively. The reset operation, if performed, occurs by taking the reset line RST 108 to its logic high level, and the reset line RSTB 200 to its logic low level. The voltage levels of the reset lines RST 108 and RSTB 200 are arranged so that the logic low level of reset line RSTB 200 and the logic high level of the reset line RST 108 are identical, a value VRST. The value VRST is chosen so as to be sufficient to ensure that transistor 94 is turned off at this voltage. When the reset operation is effected, one of diodes 148 or 202 is forward biased, and so the sense node 102 is charged/discharged to the voltage level VRST. Following the completion of the reset operation, the reset line RST 108 is taken to its logic low level and the reset line RSTB 200 to its logic high level. The voltage levels of the reset line RST 108 low logic level and reset line RSTB 200 high logic level are each arranged so as to be sufficient to keep both diodes 148 and 202 reversed biased for the remainder of the sense operation.

The sense circuitry in the embodiment of FIG. 24 includes the sensor row select line RWS 104, coupling capacitor $C_C$, transistor 94 and sensor output line COL 106. In order to sense the impedance presented at the drive element by the hydrophobic cell in the array element, a voltage pulse of amplitude ΔVRWS is then applied to the sensor row select line RWS 104. The pulse is coupled to the EW drive electrode 152 via the storage capacitor $C_S$. Since transistor 68 is turned off the voltage $V_{WRITE}$ at the EW drive electrode 152 is then perturbed by an amount ($\Delta V_{WRITE}$) that is proportional to ΔVRWS and also depends on the magnitude of the voltage pulse on sensor row select line RWS 104 and the relative values of the capacitors $C_C$, $C_S$ and $C_L$ (and also parasitic capacitances of transistors 94 and 68 and diodes 148 and 202). In the assumption that the parasitic components are small the perturbation is given by:

$$\Delta V_{WRITE} = \Delta VRWS \times \frac{C_S}{C_{TOTAL}} \quad \text{(equation 2)}$$

Where $$C_{TOTAL} = C_S + C_C + C_L \quad \text{(equation 3)}$$

In general the capacitive components are sized such that storage capacitor $C_S$ is of similar order in value to the load impedance as represented by capacitor $C_L$ in the case when a droplet is present, and such that the storage capacitor $C_S$ is 1-2 orders of magnitude larger in value than the coupling capacitor $C_C$. The perturbation $\Delta V_{WRITE}$ in the voltage of the EW drive electrode 152 due to the pulse ΔVRWS on the sensor row select line RWS 104 then also results in a perturbation $\Delta V_{SENSE}$ of the potential at the sense node 102 due to the effects of the coupling capacitor $C_C$. The perturbation $\Delta V_{SENSE}$ in potential at the sense node 102 is given approximately by $$\Delta V_{SENSE} = \Delta V_{WRITE} \times \frac{C_C}{C_C + C_{DIODE} + C_T}$$

where $C_{DIODE}$ represents the capacitance presented by diode 148 and $C_T$ represents the parasitic capacitance of transistor 94. In general the circuit is designed so that the coupling capacitor $C_C$ is larger than the parasitic capacitances $C_{DIODE}$ and $C_T$. As a result the perturbation $\Delta V_{SENSE}$ of the voltage at the sense node 102 is in general similar to the perturbation $\Delta V_{WRITE}$ of the write node voltage at the EW drive electrode 152 (though this is not necessarily required to be the case). Capacitor $C_S$ has a dual function; it functions as a storage capacitor, storing an electrowetting voltage is written to the array element. It also functions as a reference capacitor when sensing impedance; the impedance is measured essentially by comparing $C_S$ to the droplet capacitance $C_{drop}$.

The overall result of pulsing the sensor row select line RWS 104 is that the voltage potential at the sense node 102 is perturbed by an amount $\Delta V_{SENSE}$ that depends on the impedance represented by capacitor $C_L$ (which again is dependent on the presence of, size of and constitution of any droplet located at the particular array element) for the duration of the RWS pulse. As a result the transistor 94 may be switched on to some extent during the RWS operation in which the RWS pulse is applied to the sensor row select line RWS 104. The sensor output line COL 106 is loaded by a suitable biasing element (e.g. a resistor or a transistor, not shown), which may be common to each array element in the same column. Transistor 94 thus operates as a source follower and the output voltage appearing at the sensor output line COL 106 during the row select operation is a function of the impedance represented by capacitor $C_L$. This voltage may then be sampled and read out by a second stage amplifier using well known techniques, as for example described for an imager-display as referenced in the prior art section. The array element circuit of FIG. 24 thus acts to sense and measure the value of $C_L$. By selective addressing of the reset lines RST 108 and RSTB 200, the sensor row select line RWS 104, and the sampling of the output on the sensor output line COL 106, the impedance represented by the capacitor $C_L$ can be measured at each element within an array. The measured impedance in turn represents the presence of, size and constitution of any droplet located at the particular element within the array It may be noted that following the sense operation when the voltage on the sensor row select line RWS 104 is returned to its original value, the potential of the EW drive electrode 152 returns to substantially the same value as prior to the sense operation. In this regard the sensor operation is non-destructive; indeed any voltage written to the EW drive electrode 152 is only disturbed for the duration of the RWS pulse on the sensor row select line RWS 104 (which is typically only for a few microseconds, for example). It may also be noted that in this arrangement there is no additional DC leakage path introduced to the EW drive electrode 152.

It may also be noted that it is not in all cases necessary to perform the reset operation using reset lines RST 108 and RSTB 200 at the start of every sense operation. In some instances it may be adequate and/or preferable to reset the sense node 102 on a more occasional basis. For example, if a series of sensor measurements are to be made a single reset operation could be performed before making the first measurement but with no reset performed between measurements. This may be advantageous because the potential at the sense node 102 immediately prior to each measurement would not be subject to variability due to the imperfections of the reset operation. Variability in the reset level could be affected by factors such as ambient illumination and temperature which may be subject to variations during the course of the measurements.

It may also be noted that in certain circumstances it may also be advantageous to perform the reset operation whilst the AM-EWOD write voltage $V_{WRITE}$ is being written to the EW drive electrode 152 via the source addressing line 62.

This is the case, for example, if one wishes to perform a sense operation on array elements within one row of the array whilst simultaneously writing a voltage to the EW drive electrode 152 of array elements in a different row. This is because during the write operation, if a step in voltage occurs at the EW drive electrode 152, then a proportion of this voltage will couple via coupling capacitor $C_C$ 146 to the sense node 102. This may have the effect of turning on to some extent transistor 94 in the row to which a write voltage $V_{WRITE}$ is being written. This will in turn influence the potential of the sensor output line COL 106, and thus affect the sensor function of the row being sensed. This difficulty can be avoided by performing a reset operation on the row being written, thus pinning the potential of the sense node 102 for elements in this row and preventing transistor 94 from being turned on.

The advantages of this embodiment are as follows:

A voltage $V_{WRITE}$ programmed to the EW drive electrode 152 is not destroyed by performing the sense operation and is only disturbed for a short duration during the application of the sensor row select pulse on the sensor row select line RWS 104

No additional DC leakage path to the EW drive electrode 152 is introduced by the addition of the sensor function—the only leakage path of charge written to the EW drive electrode 152 is through the transistor 68, as is the case for a standard AM-EWOD.

In the case where high voltages are required to be written to the EW drive electrode 152, the only active device which is specifically required to be high voltage compatible is the switch transistor 68. In particular devices 94, 148 and 202 are not required to be high voltage compatible. This is especially important for transistor 94, which has an analogue function and may therefore be impaired in performance if device engineering to improve robustness (e.g. LDD, GOLD, increased length, etc) is required. A circuit arrangement whereby 94, 148 and 202 can be standard low voltage devices is also advantageous in that these devices have a smaller footprint in layout. This may facilitate a smaller physical dimension of array element size and/or create space for other circuitry to be included within the array element.

Low voltage operation of circuit components may improve circuit yield and increase product robustness.

It may be noted that none of these advantages would be realised in the case where the sense node 102 was DC coupled to the EW drive electrode 152 (for example by replacing coupling capacitor $C_C$ 146 with a short circuit). In this case an additional leakage path would be introduced to the EW drive electrode 152 (leakage through the reverse biased diode 148), the EW drive voltage $V_{WRITE}$ as written would be destroyed by performing the sense operation and high voltages would appear across the terminals of transistor 94 and diode 148.

In a typical design, the value of storage capacitor $C_S$ may be relatively large, for example several hundred femto-farads (fF). To minimise the layout area it is therefore advantageous to implement this device as a MOS capacitor.

Figure 25:
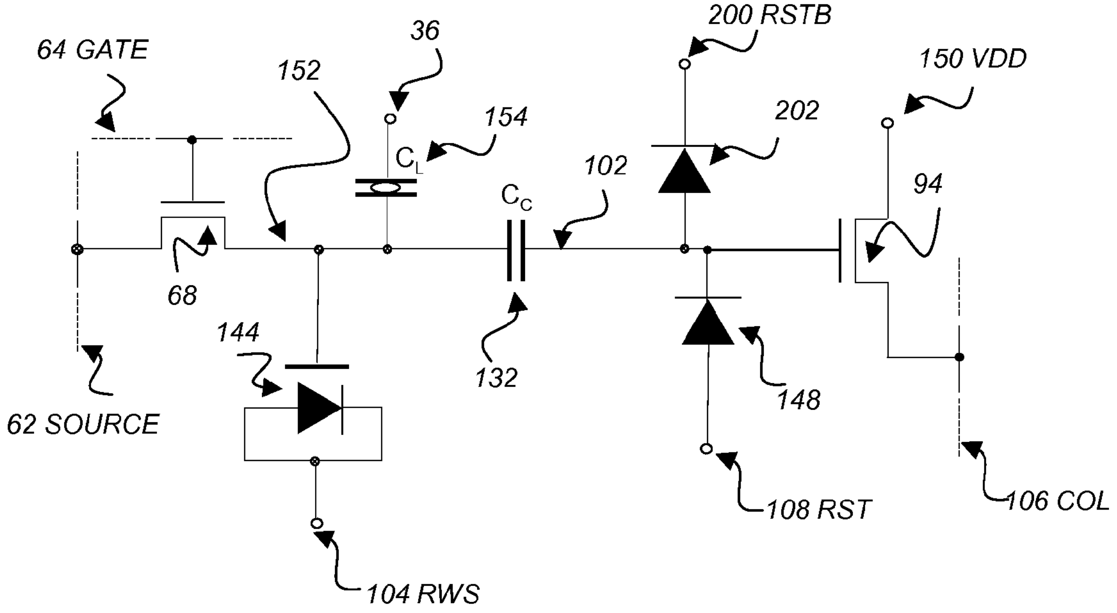
FIG. 25 shows a second embodiment of the invention.

A second embodiment of the invention is shown in FIG. 25. This embodiment is identical to the first embodiment except that the capacitor $C_S$ 58 is replaced by a gated P-I-N diode 144 as described above with reference to FIG. 21. The gated diode is connected such that the anode and cathode are connected together and are connected to the sensor row select line RWS 104 and the gate terminal is connected to the EW drive electrode 152.

The operation of the second embodiment is identical to that of the first embodiment, where the gated P-I-N diode 144 performs the function of the capacitor $C_S$ of the first embodiment. In general the voltage levels of the pulse provided on the sensor row select line RWS 104 are arranged such that the capacitance of the gated P-I-N diode 144 is maintained at the maximum level for both the high and low levels of the RWS voltage.

The advantage of this embodiment is that by using a gated P-I-N diode 144 to perform the function of a capacitor, the voltage levels assigned to the RWS pulse are not required to be arranged so that the voltage across the device is always above a certain threshold level (in order to maintain the capacitance). This means that the voltage levels of the RWS pulse high and low levels can, for example, reside wholly within the programmed range of the EW drive voltages. The overall range of voltages required by the array element circuit as a whole is thus reduced compared to that of the first embodiment where a MOS capacitor is used to implement capacitor $C_S$ 58.

This advantage is realised whilst also maintaining a small layout footprint of the gated diode, comparable to that of a MOS capacitor. The small layout footprint may be advantageous in terms of minimising the physical size of the circuit elements in the array, for the reasons previously described. It will be apparent to one skilled in the art that this embodiment could also be implemented with the gated P-I-N diode 144 connected the other way round, i.e. with the anode and cathode terminals both connected to the EW drive electrode 152, and the gate terminal connected to the sensor row select line RWS 104.

It will be readily apparent to one skilled in the art that a number of variants to the circuits of the first and second embodiments could also be implemented. For example, the source follower transistor 94 and switch transistor 68 could both be implemented with pTFT devices rather than nTFT devices.

None of these changes substantially affect the basic operation of the circuit as described above. Therefore, further detail is omitted for sake of brevity.

Figure 26:
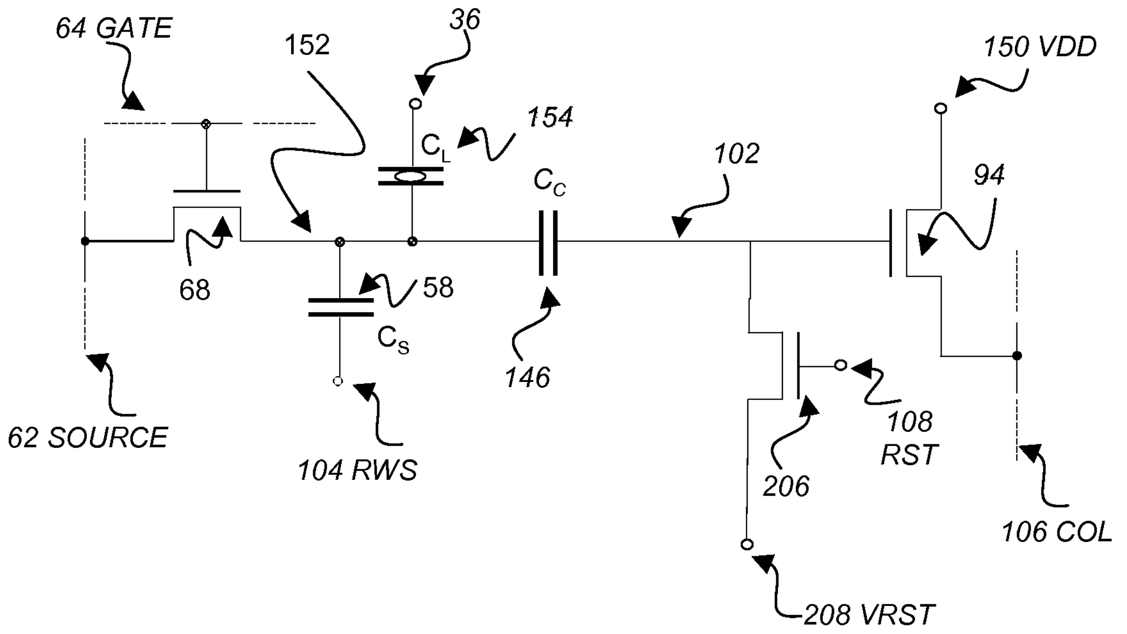
FIG. 26 shows a third embodiment of the invention.

The third embodiment of the invention is shown in FIG. 26. This embodiment is as the first embodiment except that the diodes 148 and 202 have been removed, the reset line RSTB 200 has been removed, and the following additional array elements have been added An n-type transistor 206

A power supply line VRST 208 which may be common to all elements in the array.

The reset line RST 108 in this embodiment is connected to the gate of transistor 206. The source and drain terminals of transistor 206 are connected to the sense node 102 and the power supply line VRST 208 respectively.

The operation of this embodiment is as described for the first embodiment except in the performance of the reset operation. In this embodiment reset is performed by taking the reset line RST 108 to a logic high level. This has the effect of turning on transistor 206 such that the potential of the sense node 102 is charged/discharged to the reset potential on power supply line VRST 208. When the reset operation is not being performed, the reset line RST 108 is switched to logic low so as to switch transistor 206 off.

An advantage of this embodiment over the first embodiment is that it can be implemented without the need for any diode elements (diodes may not be available as standard library components within the manufacturing process). A further advantage of this embodiment is that the array element circuit requires only n-type TFT components and is thus suitable for implementation within a single channel manufacturing process (where only n-type devices are available).

Figure 27:
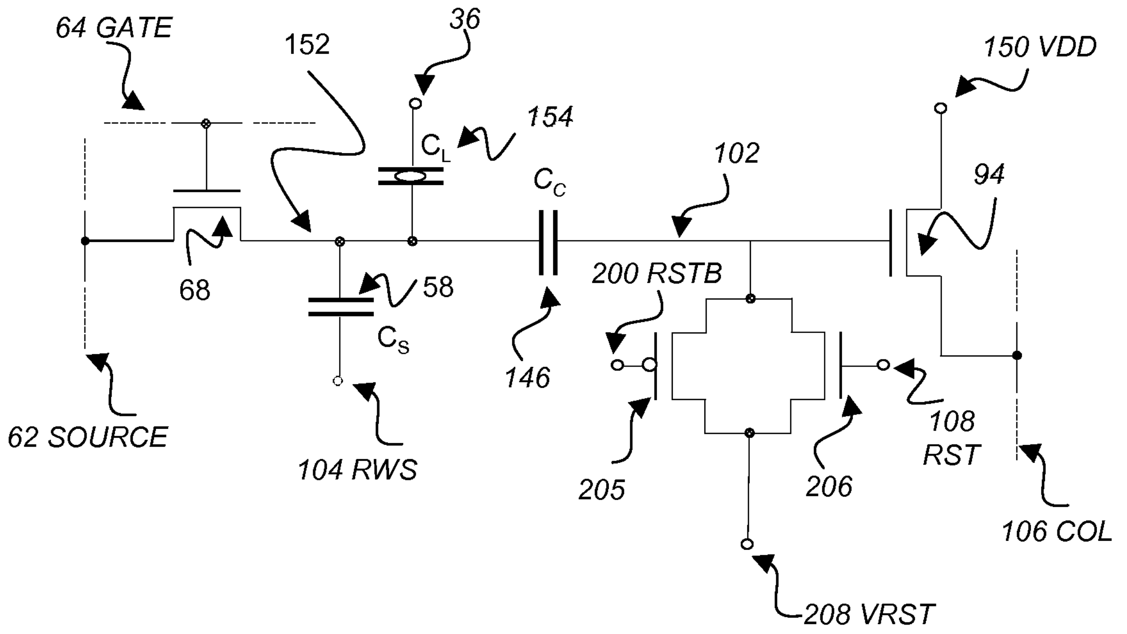
FIG. 27 shows a fourth embodiment of the invention.

The fourth embodiment is shown in FIG. 27.

This embodiment is as the first embodiment FIG. 24 except that the diodes 148 and 202 have been removed and the following additional array elements have been added A p-type transistor 205

An n-type transistor 206

A power supply line VRST 208 which may be common to all elements in the array.

The reset line RST 108 is connected to the gate of transistor 206. The reset line RSTB 200 is connected to the gate of transistor 205. The source of transistors 205 and 206 are connected together and to the sense node 102. The drain of transistors 205 and 206 are connected together and to the power supply line VRST 208.

The operation of this embodiment is as described for the first embodiment in FIG. 24 except in the performance of the reset operation. In this embodiment reset is performed by taking the reset line RST 108 to a logic high level and the reset line RSTB 200 to a logic low level. This has the effect of turning on transistors 205 and 206 such that the potential of the sense node 102 is charged/discharged to the reset potential on the power supply line VRST 208. When the reset operation is not being performed the reset lines RST 108 and RSTB 200 are switched to logic low and logic high levels respectively so as to switch transistors 205 and 206 off.

The advantages of this embodiment are as follows:

When the reset operation is performed, the sense node 102 is more rapidly discharged to the reset potential on the power supply line VRST 208 than in the case where reset is performed by diodes or by a single switch transistor as in FIGS. 24-26. This may reduce element-to-element variations in the voltage to which the sense node 102 is reset to.

The voltage levels of the logic signals applied to the reset lines RST 108 and RSTB 200 can be the same. This simplifies the design of the driver circuits in comparison to the first embodiment.

The array element circuit is implemented without the need for diodes. This may be beneficial in processes where a thin film diode is not a standard circuit element.

Figure 28:
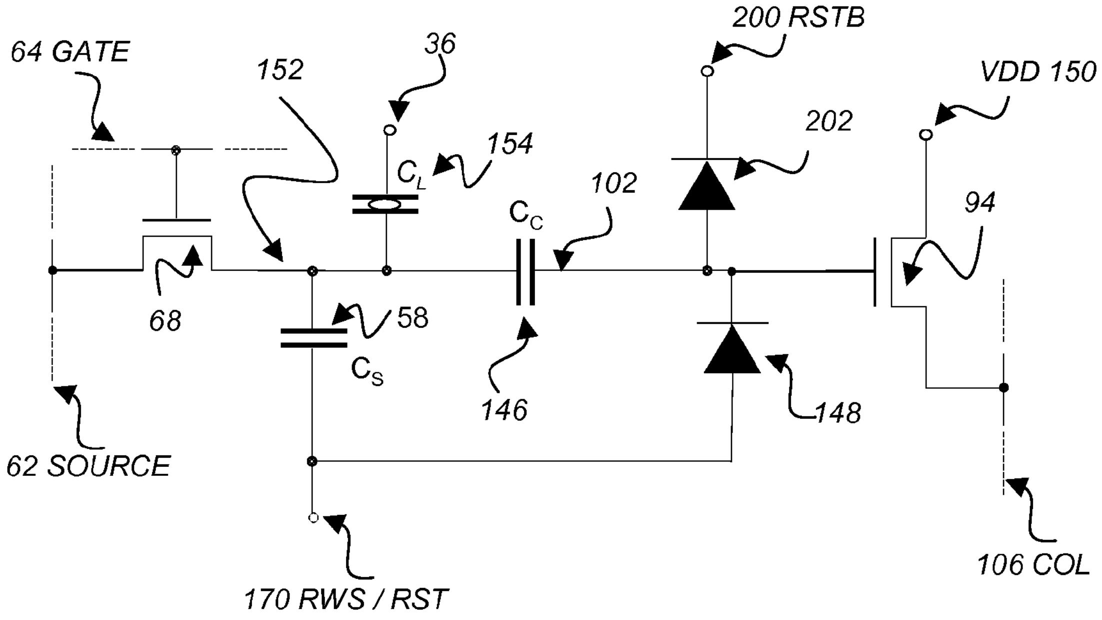
FIG. 28 shows a fifth embodiment of the invention.

The fifth embodiment of the invention is shown in FIG. 28. This embodiment is as the first embodiment except that the row select line RWS and the reset line RST are connected together to form a dual purpose line RST/RWS 170.

The operation of the array element circuit is similar to the first embodiment. Initially the sense node 102 is reset by switching the line RST/RWS 170 to a voltage level $V_1$ sufficient to forward bias diode 148 and the connection to the reset line RSTB 200 to a voltage sufficient to forward bias diode 202. The line RST/RWS 170 is then switched to a lower voltage level $V_2$ such that the diode 148 is reverse biased, and reset line RSTB 200 is taken to a high value such that diode 202 is reverse biased. During the row select operation, the line RST/RWS 170 is then switched to a third voltage level $V_3$, creating a voltage step of magnitude $V_3-V_2$, which in turn perturbs the voltage at the EW drive electrode 152 and sense node 102, thus enabling the impedance CL to be measured. A requirement for the circuit to operate properly is that voltage levels $V_2$ and $V_3$ must be less than $V_1$ and so not forward bias diode 148 during the row select operation.

An advantage of this embodiment is that the number of voltage lines required by the array element is reduced by one compared with the first and second embodiments, whilst also maintaining the capability to perform a reset operation.

Figure 29:
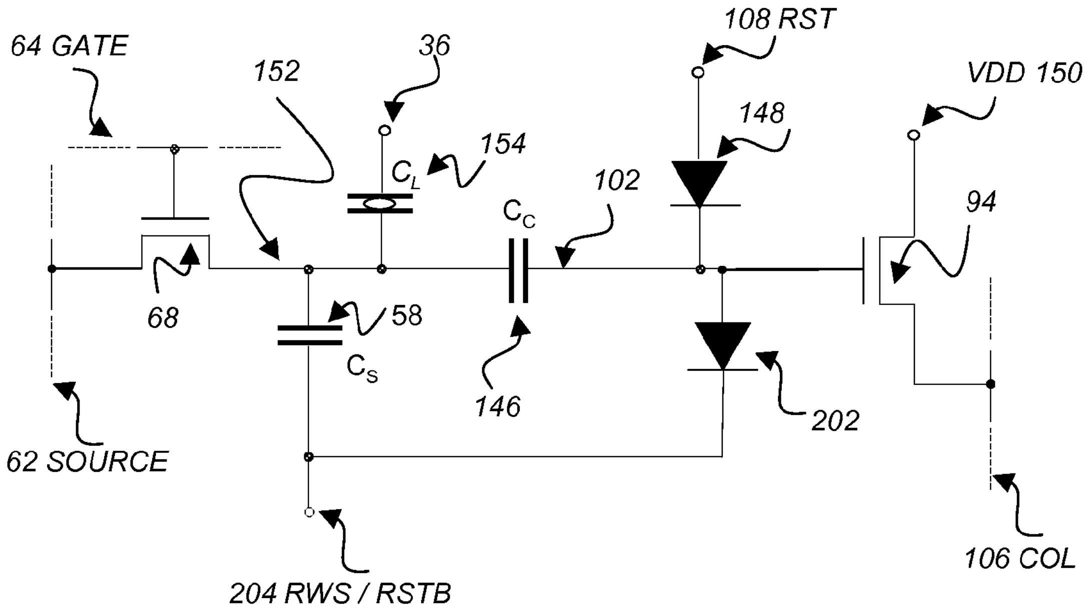
FIG. 29 shows a sixth embodiment of the invention

The sixth embodiment is shown in FIG. 29. This embodiment is as the fifth embodiment except that in this case the RSTB and RWS lines are connected together to form a common connection, the RWS/RSTB line 204. The operation is similar to the first embodiment. To perform the reset operation, the reset line RST 108 is set to a reset voltage VRST sufficient to forward bias diode 148, and the same reset voltage VRST is also applied to the RWS/RSTB line 204. The sense node 102 is thus reset to the reset voltage VRST. To perform the row select operation, diode 148 is reversed biased with an appropriate potential applied to the reset line RST 108 and a voltage level $V_5$ is applied to the RWS/RSTB line 204 in excess of VRST. The diode 202 is reverse biased and turned off, whilst simultaneously the potential of the sense node 102 is perturbed by an amount dependent on the voltage difference $V_5$−VRST and the various circuit capacitances as described in the first embodiment.

An advantage of the sixth embodiment in comparison to the first embodiment is that the number of voltage lines required by the array element is reduced by one. An advantage of the sixth embodiment compared to the fifth embodiment is that only two different voltage levels need to be applied to the line RWS/RSTB line 204 during operation. This has the advantage of simplifying the control circuits required to drive the connection.

It will be apparent to one skilled in the art that the fifth and sixth embodiments could also be implemented where the source follower transistor if a p-type transistor and the row select operation is implemented by a negative going pulse applied to the RWS/RST, RWS/RSTB lines.

Figure 30:
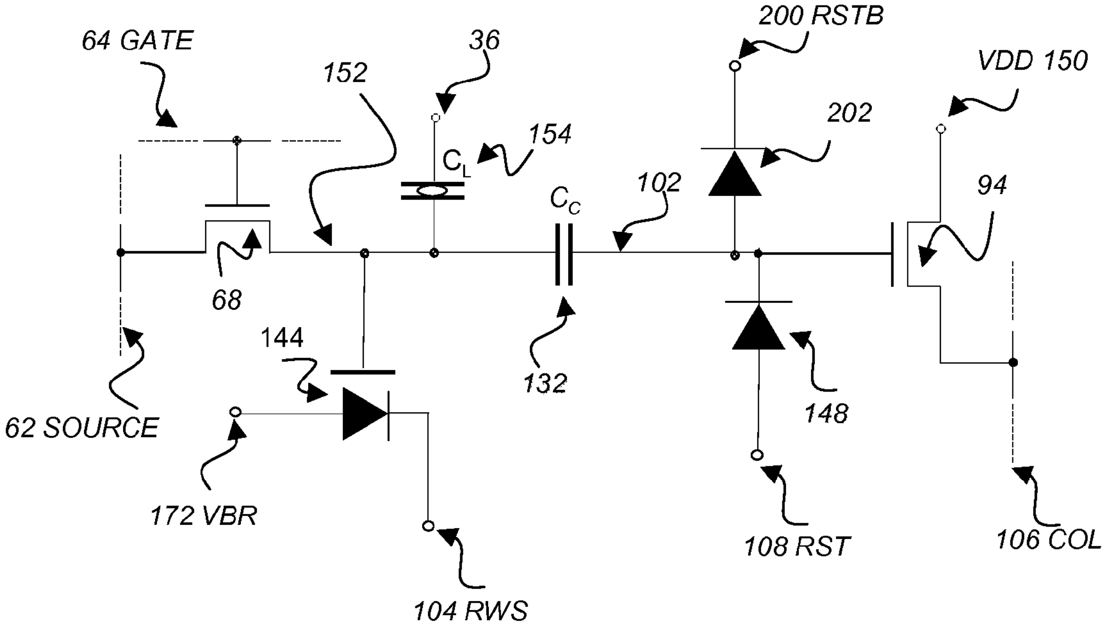
FIG. 30 shows a seventh embodiment of the invention

The seventh embodiment of the invention is shown in FIG. 30. This embodiment is as the second embodiment except that instead of connecting the anode terminal of the gated P-I-N diode 144 to the sensor row select line RWS 104, it is instead connected to a bias supply VBR 172. This connection may be driven separately for each array element in the same row. The bias supply VBR is set to a voltage that is always negative with respect to the sensor row select line RWS 104 voltage so that the gated P-I-N diode 144 is always reverse biased.

The operation of the circuit is essentially similar to that of the second embodiment with the exception that the bias supply VBR 172 is maintained at a bias VX below that of the bias voltage of the sensor row select line RWS 104 throughout the operation of the circuit. This has the effect of making the gated P-I-N diode 144 function like a voltage dependent capacitor, having a bias dependence that is a function of VX, as described in prior art.

By choosing the range of operation of the RWS pulse high and low levels and an appropriate value of VX it is therefore possible to make the gated P-I-N diode 144 function as a variable capacitor whose value depends upon the choice of VX. The overall circuit functions as described in the second embodiment, where the gated P-I-N diode 144 is a capacitor whose capacitance can be varied. The circuit can therefore effectively operate in different ranges according to whether this capacitance is arranged to take a high or a low value An advantage of the circuit of this embodiment is that a higher range of droplet impedances can be sensed than may be the case if the capacitance is implemented as a fixed value. A further advantage is that a variable capacitor may be implemented by means of no additional circuit components and only one additional bias line.

Whilst this embodiment describes a particularly advantageous implementation of a variable capacitance, it will be apparent to one skilled in the art that there are multiple other methods for implementing variable or voltage dependent capacitors. For example, additional TFTs which function as switches could be provided. These could be configured to switch in or out of the circuit additional capacitor elements. These could be arranged either in series or in parallel with capacitor $C_S$.

Figure 31:
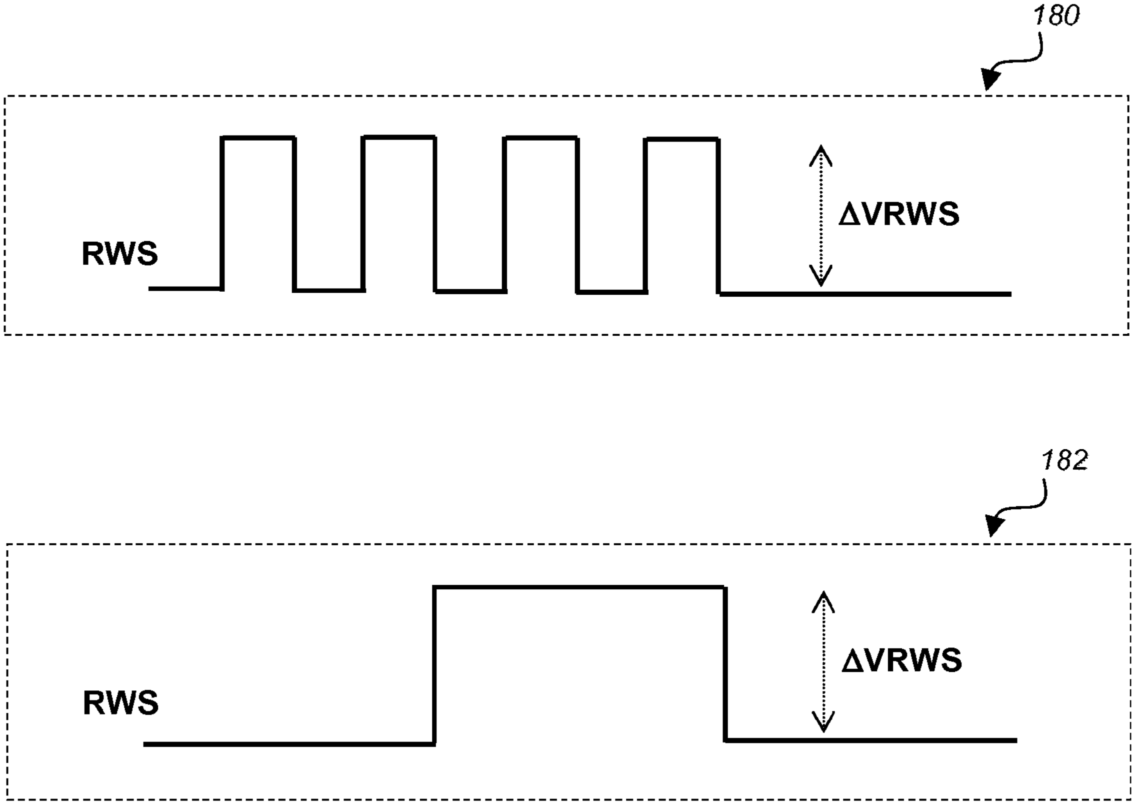
FIG. 31 shows a timing sequences applied to the row select connection of the pixel circuit according to the operation of the eighth embodiment of the invention.

The eighth embodiment of the invention is as any of the previous embodiments where the voltage pulse applied to the sensor row select line RWS 104 is arranged to consist of N multiple pulses. This is shown in FIG. 31, with the row select pulse 180 as applied to the sensor row select line RWS 104 in the case where N=4, where N represents the number of pulses. Also shown for comparison in the same Figure is the row select pulse 182 as applied to the sensor row select line RWS 104 of the previous embodiments.

The operation of the circuit is then otherwise identical to as was described in the first embodiment. However the response of the array element circuit to the modified RWS pulse 180 may differ in accordance with the constituent components of the droplet impedance. This can be appreciated with reference to FIG. 8. When a voltage pulse is applied across the compound droplet impedance, the response of the intermediate node 47 is time dependent; this node takes a certain time to charge/discharge in accordance with the component values $R_{drop}$ and $C_{drop}$. These component values depend on the droplet constitution. The response of the circuit may therefore be a function of the number and duration of RWS pulses applied to the sensor row select line RWS 104.

According to this embodiment, a series of multiple impedance measurements may be made, these being performed where the number of component pulses comprising the row select pulse, N, is different for each individual measurement. By determining the sensor output for two or more different values of N it is thus possible to measure the frequency dependence of the droplet capacitance $C_L$. Since the insulator capacitance C, is generally known, this method can further be used to determine information regarding the impedance components $C_{drop}$ and $R_{drop}$. Since these are related to the droplet constitution, for example its conductivity, information regarding the droplet constitution may be determined.

In this mode of operation it is useful, although not essential, to arrange the RWS pulse on the sensor row select line RWS 104 such that the total time for which this connection is at the high level is the same for each N. This ensures that the source follower transistor 94 is turned on (to an extent determined by the various impedances) for the same amount of time, regardless of the value of N.

Figure 32:
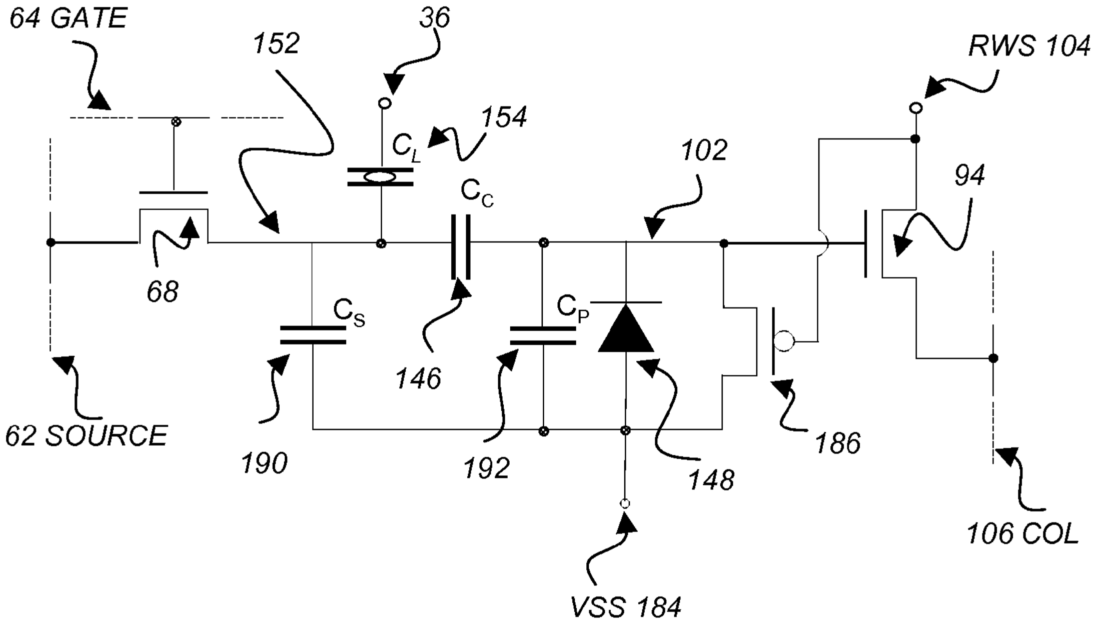
FIG. 32 shows a ninth embodiment of the invention.

The ninth embodiment of the invention is shown in FIG. 32. This consists of an alternative array element circuit for an AM-EWOD device with integrated impedance sensor.

The circuit contains the following elements:

A switch transistor 68

A capacitor $C_S$ 190

A capacitor $C_P$ 192

A coupling capacitor $C_C$ 146

A diode 148

A transistor 94

A transistor 186

Connections supplied to the array element are as follows:

A source addressing line 62 which is shared between array elements in the same column A gate addressing line 64 which is shared between array elements in the same row A sensor row select line RWS 104 which is shared between array elements in the same row A power supply line VSS 184 which is common to all elements in the array A sensor output line COL 106 which is shared between array elements in the same column Each array element contains an EW drive electrode 152 to which a voltage $V_{WRITE}$ can be programmed. Also shown represented is a load element $C_L$ 154 representing the impedance between the EW drive electrode 152 and the counter-substrate 36. The value of $C_L$ is dependent on the presence of, size of and constitution of any droplet at the array element in the array as in the previous embodiments.

The circuit is connected as follows:

The source addressing line 62 is connected to the drain of transistor 68. The gate addressing line 64 is connected to the gate of transistor 68. The source of transistor 68 is connected to the EW drive electrode 152. Capacitor $C_S$ 190 is connected between the EW drive electrode 152 and the power supply line VSS 184. Coupling capacitor $C_C$ 146 is connected between the EW drive electrode 152 and the gate of transistor 94. The anode of the diode 148 is connected to the power supply VSS 184. The cathode of the diode 148 is connected to the gate of transistor 94. Coupling capacitor $C_C$ 146 is connected between the EW drive electrode 152 and power supply VSS 184. The drain of the switch transistor T3 186 is connected to the gate of transistor 94. The source of transistor T3 is connected the power supply VSS 184. The gate of transistor T3 186 is connected to the sensor row select line RWS 104. The drain of transistor 94 is connected to the sensor row select line RWS 104. The source of transistor 94 is connected to the sensor output line COL 106. The capacitor $C_P$ is connected between the sense node 102 and the power supply VSS 184.

The operation of the circuit is as follows:

In order to write a voltage, the required write voltage $V_{WRITE}$ is programmed onto the source addressing line 62. The gate addressing line 64 is then taken to a high voltage such that transistor 68 is switched on. The voltage $V_{WRITE}$ (plus or minus a small amount due to non-ideality of 68) is then written to the EW drive electrode 152 and stored on the capacitance present at this node, and in particular on capacitor $C_S$. The gate addressing line 64 is then taken to a low level to turn off transistor 68 and complete the write operation.

In order to sense the impedance presented at the EW drive electrode 152, a voltage pulse is applied to the electrode of the counter-substrate 36. A component of this voltage pulse is then AC coupled onto the EW drive electrode 152 and on to the sense node 102. For the row of the array element to be sensed, the sensor row select line RWS 104 is taken to a high voltage level. This results in switch transistor T3 186 being switched off so that there is no DC path to ground from the sense node 102. As a result the voltage coupled onto the sense node 102 results in the source follower transistor 94 being partially turned on to an extent which is in part dependent on the capacitive load of the droplet $C_L$. The function of capacitor $C_P$ is to ensure that voltage coupled onto the sense node 102 from the pulse applied to the counter substrate is not immediately discharged by parasitic leakage through transistor 186 and diode 148. $C_P$ should therefore be sufficiently large to ensure that the potential at the sense node 102 is not unduly influenced by leakage through the transistor 186 and the diode 148 for the duration of the sense operation.

For row elements not being sensed, transistor 186 remains switched on so that the component of the voltage pulse from the counter-substrate 36 coupled onto the sense node 102 is immediately discharged to VSS.

To ensure successful operation, the low level of the RWS pulse and the bias supply VSS must be arranged such that the source follower transistor 94 remains switched off when the RWS pulse on the sensor row select line RWS 104 is at the low level.

An advantage of this embodiment compared to the first embodiment is that one fewer voltage supply line per array element is required.

Figure 33:
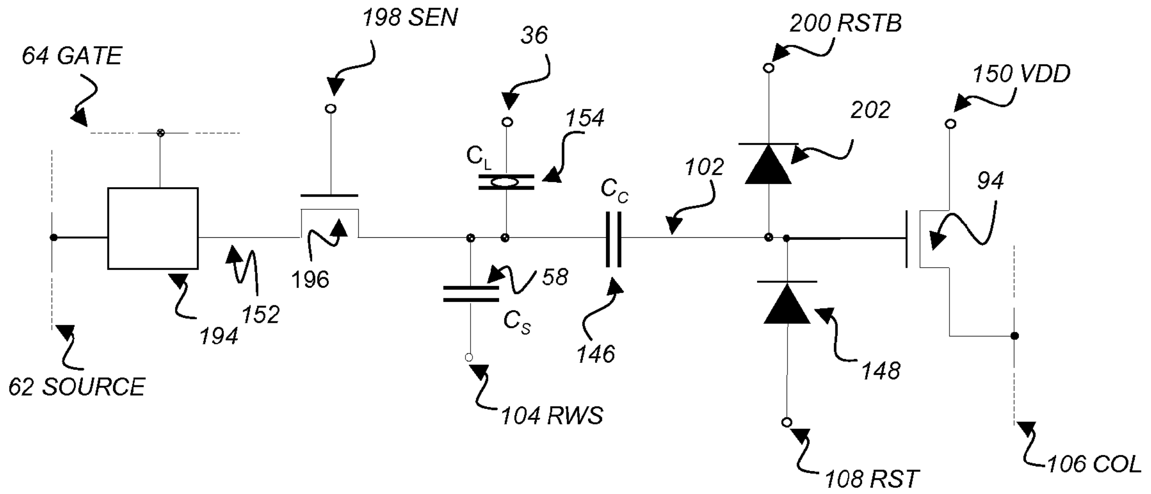
FIG. 33 shows a tenth embodiment of the invention.

The tenth embodiment of the invention is shown in FIG. 33.

The circuit contains the following elements:

A transistor 196

A capacitor $C_S$ 58

A coupling capacitor $C_C$ 146

A diode 148

A diode 202

A transistor 94

An SRAM cell 194 of standard construction containing input, output and enable terminals Connections supplied to the array element are as follows:

A source addressing line 62 which is shared between array elements in the same column A gate addressing line 64 which is shared between array elements in the same row A sensor enable line SEN 198 which may be shared between array elements in the same row or which in an alternative implementation may be common to all elements in the array A sensor row select line RWS 104 which is shared between array elements in the same row A reset line RST 108 which is shared between array elements in the same row A second reset line RSTB 200 which is shared between array elements in the same row A power supply line VDD 150 which is common to all elements in the array A sensor output line COL 106 which is shared between array elements in the same column Each array element contains an EW drive electrode 152 to which a voltage $V_{WRITE}$ can be programmed. Also shown represented is a load element $C_L$ 154 representing the impedance between the EW drive electrode and the counter-substrate 36. The value of $C_L$ is dependent on the presence of, size of and constitution of any droplet at the located at that array element within the array.

The circuit is connected as follows:

The source addressing line 62 is connected to the input of the SRAM cell 194. The gate addressing line 64 is connected to the enable terminal of the SRAM cell 194. The output of the SRAM cell is connected to the drain of transistor 196. The source of transistor 196 is connected to the EW drive electrode 152. The sensor enable line SEN 198 is connected to the gate of transistor 196. Capacitor $C_S$ 58 is connected between the source of 196 and the sensor row select line RWS 104. Coupling capacitor $C_C$ 146 is connected between the source of 196 and the gate of transistor 94. The anode of the diode 148 is connected to the reset line RST 108. The cathode of the diode 148 is connected to the gate of transistor 94 and to the anode of diode 202. The cathode of diode 202 is connected to the reset line RSTB 200. The drain of transistor 94 is connected to the VDD power supply line 150. The source of transistor 94 is connected to the sensor output line COL 106.

The operation of the circuit is similar to the first embodiment, except that a digital value is written to the EW drive electrode 152. To write a voltage to the EW drive electrode 152, the sensor enable line SEN 198 is taken high to switch on transistor 196. The required digital voltage level (high or low) is programmed on to the source addressing line 62. The gate addressing line 64 is then set high to enable the SRAM cell 194 of the row being programmed and write the desired logic level onto the SRAM cell 194. The gate addressing line 64 is then taken low to complete the writing operation.

To perform a sensor operation the sensor enable line SEN 198 is taken low. The rest of the sensor portion of the circuit then operates in the same way as was described for the first embodiment of the invention. Following completion of the sensor operation the sensor enable line SEN 198 can be taken high again so that the programmed voltage stored on the SRAM cell 194 can be once again written to the EW drive electrode 152.

An advantage of this embodiment is that by implementing the write function of the AM-EWOD device using an SRAM cell 194, the write voltage is not required to be continually refreshed. For this reason an SRAM implementation can have lower overall power consumption than implementation using a standard display pixel circuit as described in previous embodiments.

It will be obvious to one skilled in the art that an SRAM implementation of the write portion of the circuit may also be combined with any one of embodiments 2-8.

The eleventh embodiment is as any of the previous embodiments where the droplets consist of a non-polar material (e.g. oil) immersed in a conductive aqueous medium. An advantage of this embodiment is that the device may be used to control, manipulate and sense liquids which are non-polar.

It will be apparent to one skilled in the art that any of the previous embodiments can be implemented in an AM-EWOD device whereby thin film electronics are disposed upon a substrate to perform the dual functions of programming an EWOD voltage and sensing capacitance at multiple locations in an array.

Suitable technologies for integrated drive electronics and sensor output electronics have been described in the prior art section.

It will be further apparent to one skilled in the art that such an AM-EWOD device can be configured to perform one or more droplet operations as described in prior art, where the sensor function described can be used to perform any of the functions described in prior art.

It will be further apparent to one skilled in the art that the AM-EWOD device described could form part of a complete lab-on-a-chip system as described in prior art. Within such as system, the droplets sensed and/or manipulated in the AM-EWOD device could be chemical or biological fluids, e.g. blood, saliva, urine, etc, and that the whole arrangement could be configured to perform a chemical or biological test or to synthesise a chemical or biochemical compound.

Although the invention has been shown and described with respect to a certain embodiment or embodiments, equivalent alterations and modifications may occur to others skilled in the art upon the reading and understanding of this specification and the annexed drawings. For example, while the present invention has been described herein primarily in the context of an EWOD device it will be appreciated that the invention is not limited to an EWOD device and may also be utilized more generally in any type of array device in which it is desirable to incorporate an integrated impedance sensor. For example, it will be apparent to one skilled in the art that the invention may also be utilized in alternative systems wherein there is a requirement to write a voltage to a drive electrode and sense the impedance at the same node. For example the invention may be applied to a droplet manipulation dielectrophoresis system such as described in the prior art section which also contains an integrated impedance sensor capability. According to another example, the invention may be applied to an electrowetting based display, as for example described in the prior art section, having an-inbuilt capability for sensing the impedance of the fluid material used to determine the optical transmission of the display. In this application the impedance sensor capability may be used, for example as a means for detecting deformity of the fluid material due to the display being touched and thus function as a touch input device. Alternatively the impedance sensor capability may be used as a means for detecting faulty array elements which do not respond in the correct manner to the applied EW drive voltage.

In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

Industrial Applicability

By integrating sensor drive circuitry and output amplifiers into the AM-EWOD drive electronics, the impedance can be measured at a large number of points in an array with only a small number of connections being required to be made between the AM-EWOD device and external drive electronics. This improves manufacturability and minimises cost compared to the prior art

The invention claimed is:

1. An array element circuit with an integrated impedance sensor, comprising:
- an array element which is controlled by application of a drive voltage by a drive element;
- writing circuitry for writing the drive voltage to the drive element; and
- sense circuitry for sensing an impedance presented at the drive element;

wherein:
- the array element is a hydrophobic cell having a surface of which the hydrophobicity is controlled by the application of the drive voltage by the drive element, and the sense circuitry senses the impedance presented at the drive element by the hydrophobic cell,
- and the writing circuitry writes the drive voltage to the drive element independently of the sense circuitry sensing the impedance at the drive element.

2. The array element circuit according to claim 1, wherein:
- the writing circuitry is configured to perturb the drive voltage written to the drive element;
- the sense circuitry is configured to sense a result of the perturbation of the drive voltage written to the drive element, the result of the perturbation being dependent upon the impedance presented at the drive element; and
- the sense circuitry includes an output for producing an output signal a value of which represents the impedance presented at the drive element.

3. The array element circuit according to claim 1, wherein the sense circuitry is AC coupled to the drive element.

4. The array element circuit according to claim 1, wherein:
- the drive element includes a node between the hydrophobic cell and a capacitor which stores the written drive voltage; and
- the sense circuitry includes a sensor row select line connected to the capacitor, the sensor row select line serving to provide at least one pulse to the node via the capacitor in order to sense the impedance presented at the drive element.

5. The array element circuit according to claim 4, wherein the capacitor is formed by a gated diode.

6. The array element circuit according to claim 1, wherein:
- the sense circuitry comprises a sense node AC coupled to the drive element; and
- the sense circuitry further comprises reset circuitry for resetting a voltage at the sense node prior to sensing the impedance presented at the drive element.

7. The array element circuit according to claim 6, wherein:
- the reset circuitry comprises a pair of diodes connected in series with the sense node therebetween and connected at opposite ends to corresponding reset lines.

8. The array element circuit according to claim 6, wherein:
- the reset circuitry comprises at least one transistor having a gate coupled to a reset line for selectively coupling the sense node to a reset potential.

9. The array element circuit according to claim 1, the array element circuit comprising a counter-substrate and the impedance presented at the drive element representing the impedance between the drive element and the counter-substrate.

10. The array element circuit according to claim 1, wherein the array element comprises a display element, and application of the drive voltage by the drive element controls an optical property of the display element.

11. An active-matrix device, comprising:
- a plurality of array element circuits arranged in rows and columns;
- a plurality of source addressing lines each shared between the array element circuits in corresponding same columns;
- a plurality of gate addressing lines each shared between the array element circuits in corresponding same rows; and
- a plurality of sensor row select lines each shared between the array element circuits in corresponding same rows, wherein each of the plurality of array element circuits comprises:

an array element which is controlled by application of a drive voltage by a drive element;

writing circuitry for writing the drive voltage to the drive element, the writing circuitry being coupled to a corresponding source addressing line and gate addressing line among the plurality of source addressing lines and gate addressing lines; and sense circuitry for sensing an impedance presented at the drive element, the sense circuitry being coupled to a corresponding sensor row select line, and wherein:

the array elements are hydrophobic cells having a surface of which the hydrophobicity is controlled by the application of the drive voltage by a corresponding drive element, and the sense circuitry senses the impedance presented at the drive element by the hydrophobic cell, and for each of the plurality of array element circuits, the writing circuitry writes the drive voltage to the drive element independently of the sense circuitry sensing the impedance at the drive element.

12. The device according to claim 11, wherein with respect to each of the plurality of array element circuits:

the writing circuitry is configured to perturb the drive voltage written to the drive element;

the sense circuitry is configured sense a result of the perturbation of the drive voltage written to the drive element, the result of the perturbation being dependent upon the impedance presented at the drive element; and the sense circuitry includes an output for producing an output signal a value of which represents the impedance presented at the drive element.

13. The device according to claim 11, wherein:

the device includes a plurality of sensor output lines each shared between the array element circuits in corresponding same columns, and the outputs of the plurality of array element circuits are coupled to a corresponding sensor output line.

14. The device according to claim 11, wherein in each of the plurality of array element circuits the sense circuitry is AC coupled to the drive element.

15. The device according to claim 11, wherein with respect to each of the plurality of array element circuits:

the drive element includes a node between the hydrophobic cell and a capacitor which stores the written drive voltage; and the corresponding row select line is connected to the capacitor, the sensor row select line serving to provide at least one pulse to the node via the capacitor in order to sense the impedance presented at the drive element.

16. The device according to claim 11, wherein with respect to each of the plurality of array element circuits:

the sense circuitry comprises a sense node AC coupled to the drive element; and the sense circuitry further comprises reset circuitry for resetting a voltage at the sense node prior to sensing the impedance presented at the drive element.

17. The device according to claim 11, the device comprising a counter-substrate shared by the array element circuits, and the impedance presented at the corresponding drive element representing the impedance between the corresponding drive element and the counter-substrate.

18. The array element circuit according to claim 11, wherein the array element comprises a display element, and application of the drive voltage by the drive element controls an optical property of the display element.

* * * * *